United States Patent
Gobara et al.

(10) Patent No.: US 9,800,914 B2
(45) Date of Patent: Oct. 24, 2017

(54) COMMUNICATION SYSTEM, RECEIVING DEVICE, SERVER, AND COMMUNICATION METHOD

(71) Applicant: Panasonic Intellectual Property Management Co., Ltd., Osaka (JP)

(72) Inventors: Kunio Gobara, Osaka (JP); Satoru Matsunaga, Osaka (JP); Tadashi Kunihira, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/786,967

(22) PCT Filed: Apr. 17, 2014

(86) PCT No.: PCT/JP2014/002185
§ 371 (c)(1),
(2) Date: Oct. 23, 2015

(87) PCT Pub. No.: WO2014/181503
PCT Pub. Date: Nov. 13, 2014

(65) Prior Publication Data
US 2016/0066008 A1     Mar. 3, 2016

(30) Foreign Application Priority Data
May 9, 2013   (JP) ................................. 2013-099005

(51) Int. Cl.
H04N 5/445     (2011.01)
H04N 21/262    (2011.01)
(Continued)

(52) U.S. Cl.
CPC ... *H04N 21/26283* (2013.01); *H04N 21/4821* (2013.01); *H04N 21/4826* (2013.01); *H04N 21/6377* (2013.01); *H04N 21/6587* (2013.01)

(58) Field of Classification Search
CPC .................... H04N 21/26283; H04N 21/482
(Continued)

(56) References Cited

U.S. PATENT DOCUMENTS

2006/0098596 A1 * 5/2006 Park .................. H04H 20/61
370/329
2008/0168502 A1 * 7/2008 Trauth ............... G06Q 30/0631
725/46
(Continued)

FOREIGN PATENT DOCUMENTS

JP      9-102827      4/1997
JP      2005-142691   6/2005
(Continued)

OTHER PUBLICATIONS

International Search Report of PCT application No. PCT/JP2014/002185 dated Jul. 22, 2014.
The Extended European Search Report dated Mar. 18, 2016 for the related European Patent Application No. 14795330.1.

*Primary Examiner* — Michael Hong
(74) *Attorney, Agent, or Firm* — McDermott Will & Emery LLP

(57) ABSTRACT

Program information is transmitted and received via a communication line, and a scheduling operation can be performed based on the program information via the communication line. For that purpose, a communication system includes a receiving apparatus, a server, and an information processing apparatus which are configured to transmit data to and receive data from one another via the communication line. The information processing apparatus includes an EPG requester and a display EPG receiver. The server includes an
(Continued)

EPG request receiver, an EPG request transmitter, an EPG receiver, an EPG converter, and a display EPG transmitter. The receiving apparatus includes an EPG obtainer, an EPG request acceptor, an EPG extractor, and an EPG transmitter.

13 Claims, 15 Drawing Sheets

(51) Int. Cl.
  *H04N 21/482* (2011.01)
  *H04N 21/6377* (2011.01)
  *H04N 21/6587* (2011.01)
(58) Field of Classification Search
  USPC .......................................................... 725/39
  See application file for complete search history.

(56) References Cited

U.S. PATENT DOCUMENTS

| | | |
|---|---|---|
| 2009/0007181 A1 | 1/2009 | Nakamura |
| 2010/0146537 A1 | 6/2010 | Paik et al. |

FOREIGN PATENT DOCUMENTS

| | | |
|---|---|---|
| JP | 2008-271197 | 11/2008 |
| JP | 2008-295105 | 12/2008 |
| JP | 2009-044749 | 2/2009 |
| JP | 2012-029200 | 2/2012 |
| JP | 2013-070199 | 4/2013 |
| WO | 2007/004840 | 1/2007 |

\* cited by examiner

FIG. 5

| Device ID | Broadcaster | Broadcast start date and time | Broadcast end date and time | Program name | Event ID | Updated date and time |
|---|---|---|---|---|---|---|
| 123400 | ZAE | 2013/04/27 09:25 | 2013/04/27 09:50 | Boby and Tim | 98af | 2013/04/27 08:00 |
| 123400 | ZAE | 2013/04/27 09:50 | 2013/04/27 10:35 | You and me | 321b | 2013/04/27 08:00 |
| 123400 | ZAE | 2013/04/27 10:35 | 2013/04/27 11:00 | Dance Rev | 3422 | 2013/04/27 08:00 |
| ......... | | | | | | |
| 123400 | ANEX | 2013/04/30 21:45 | 2013/04/30 22:30 | The Bobs | 30bf | 2013/04/27 08:00 |
| 123400 | ANEX | 2013/04/30 22:30 | 2013/05/01 00:05 | History of Joh | f342 | 2013/04/27 08:00 |
| ......... | | | | | | |
| 123401 | ZAE | 2013/04/27 09:25 | 2013/04/27 09:50 | Boby and Tim | 98af | 2013/04/27 08:11 |
| 123401 | ZAE | 2013/04/27 09:50 | 2013/04/27 10:35 | You and me | 321b | 2013/04/27 08:11 |
| 123401 | ZAE | 2013/04/27 10:35 | 2013/04/27 11:00 | Dance Rev | 3422 | 2013/04/27 08:11 |

FIG. 10

| Broadcaster | Broadcast start date and time | Broadcast end date and time | Program name | Event ID | Updated date and time |
|---|---|---|---|---|---|
| ZAE | 2013/04/27 09:25 | 2013/04/27 09:50 | Boby and Tim | 98af | 2013/04/27 08:00 |
| ZAE | 2013/04/27 09:50 | 2013/04/27 10:35 | You and me | 321b | 2013/04/27 08:00 |
| ZAE | 2013/04/27 10:35 | 2013/04/27 11:00 | Dance Rev | 3422 | 2013/04/27 08:00 |
| ......... | ......... | ......... | ......... | ......... | ......... |
| ANEX | 2013/04/30 21:45 | 2013/04/30 22:30 | The Bobs | 30bf | 2013/04/27 08:00 |
| ANEX | 2013/04/30 22:30 | 2013/05/01 00:05 | History of Joh | f342 | 2013/04/27 08:00 |
| ......... | ......... | ......... | ......... | ......... | ......... |

FIG. 11

| Country | Broadcaster | Broadcast start date and time | Broadcast end date and time | Program name | Event ID | Updated date and time |
|---|---|---|---|---|---|---|
| Germany | ZAE | 2013/04/27 09:25 | 2013/04/27 09:50 | Boby and Tim | 98af | 2013/04/27 08:00 |
| Germany | ZAE | 2013/04/27 09:50 | 2013/04/27 10:35 | You and me | 321b | 2013/04/27 08:00 |
| Germany | ZAE | 2013/04/27 10:35 | 2013/04/27 11:00 | Dance Rev | 3422 | 2013/04/27 08:00 |
| ......... | | | | | | |
| Germany | ANEX | 2013/04/30 21:45 | 2013/04/30 22:30 | The Bobs | 30bf | 2013/04/27 08:00 |
| Germany | ANEX | 2013/04/30 22:30 | 2013/05/01 00:05 | History of Joh | f342 | 2013/04/27 08:00 |
| ......... | | | | | | |
| UK | HOPE | 2013/04/30 21:45 | 2013/04/30 22:30 | Funs | 43ab | 2013/04/27 06:00 |
| UK | HOPE | 2013/04/30 22:30 | 2013/05/01 00:05 | Baby Happy | ff8e | 2013/04/27 06:00 |
| ......... | | | | | | |

COMMUNICATION SYSTEM, RECEIVING DEVICE, SERVER, AND COMMUNICATION METHOD

TECHNICAL FIELD

The present disclosure relates to a communication system which displays program information from a receiving apparatus on an information processing apparatus, and performs a scheduling operation.

BACKGROUND ART

Patent Literature (PTL) 1 discloses a communication apparatus which remotely controls a video tape recorder. In this communication apparatus, a program table is stored in a database. A mobile terminal receives the program table from the database via a base station and a network, and displays the received program table. Using the mobile terminal, a user schedules a recording with reference to the program table. The mobile terminal transmits information on the scheduled recording to the video tape recorder via the base station and the network, and the video tape recorder executes the scheduled recording.

CITATION LIST

Patent Literature

PTL 1: Japanese Unexamined Patent Application Publication No. H09-102827

SUMMARY OF THE INVENTION

The present disclosure provides a communication system, a receiving apparatus, a server, and a communication method that are effective in a scheduling operation performed by an information processing apparatus for the receiving apparatus via a communication line and the server.

A communication system according to the present disclosure includes a receiving apparatus, a server, and an information processing apparatus that are configured to transmit data to and receive data from one another via a communication line. The information processing apparatus includes: an EPG (electronic program guide) requester; and a display EPG receiver. The EPG requester is configured to transmit, to the server via the communication line, an EPG request signal requesting the receiving apparatus to transmit program information. The display EPG receiver is configured to receive display program information transmitted from the server via the communication line. The server includes: an EPG request receiver; an EPG request transmitter; an EPG receiver; an EPG converter; and a display EPG transmitter. The EPG request receiver is configured to receive the EPG request signal. The EPG request transmitter is configured to transmit, to the receiving apparatus via the communication line, an EPG request transmission signal based on the EPG request signal received by the EPG request receiver. The EPG receiver is configured to receive terminal program information transmitted from the receiving apparatus via the communication line. The EPG converter is configured to convert the terminal program information received by the EPG receiver into the display program information which is in a format supported by the information processing apparatus. The display EPG transmitter is configured to transmit, to the information processing apparatus via the communication line, the display program information output from the EPG converter. The receiving apparatus includes: an EPG obtainer; an EPG request acceptor; an EPG extractor; and an EPG transmitter. The EPG obtainer is configured to obtain program information. The EPG request acceptor is configured to receive the EPG request transmission signal. The EPG extractor is configured to extract, from the program information obtained by the EPG obtainer, program information according to the EPG request transmission signal as the terminal program information. The EPG transmitter is configured to transmit the terminal program information extracted by the EPG extractor to the server via the communication line.

BRIEF DESCRIPTION OF DRAWINGS

FIG. 5 schematically illustrates an example of a terminal EPG stored in an EPG accumulator of the server according to the first exemplary embodiment.

FIG. 10 schematically illustrates an example of a terminal EPG stored in an EPG accumulator of a server according to a second exemplary embodiment.

FIG. 11 schematically illustrates another example of a terminal EPG stored in the EPG accumulator of the server according to the second exemplary embodiment.

DESCRIPTION OF EMBODIMENTS

The following describes embodiments in detail, with reference to the drawings as appropriate. It should be noted that an unnecessarily detailed description may be omitted. For example, a detailed description of a matter already known well and a redundant description of substantially the same configuration may be omitted. This is intended to avoid making the following description unnecessarily redundant, and to facilitate understanding of a person skilled in the art.

It should be noted that the accompanying drawings and the following description are provided in order that a person skilled in the art sufficiently understands the present disclosure, and thus are not intended to limit a subject matter disclosed in the claims.

First Exemplary Embodiment

The following describes a first exemplary embodiment with reference to FIGS. 1 to 10.
[1-1. Configuration]
[1-1-1. Schematic Configuration]

Figure 1:
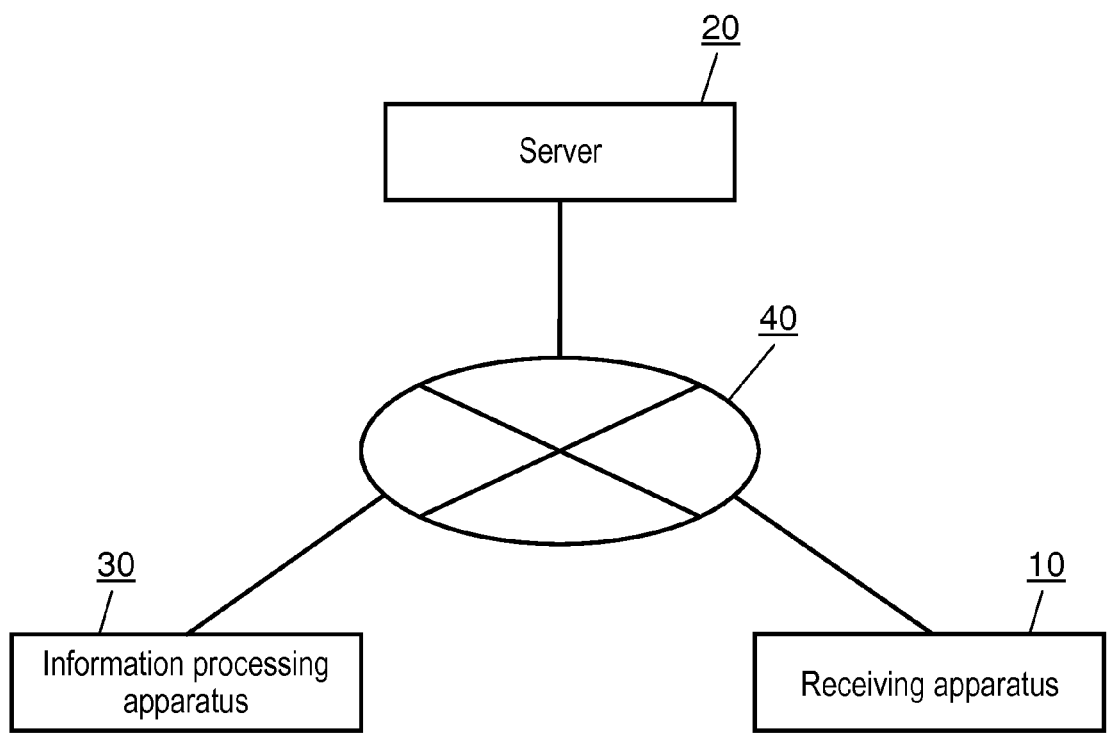
FIG. 1 is a schematic diagram illustrating a configuration of a communication system according to a first exemplary embodiment.

FIG. 1 is a schematic diagram illustrating a configuration of a communication system according to the first exemplary embodiment. A communication system according to the present embodiment includes receiving apparatus 10, server 20, and information processing apparatus 30, and these devices are connected to one another via communication line 40.

Communication line 40 is configured in a wired or wireless manner or in a wired and wireless manner. Communication line 40 is the Internet, for example, but may be an Intranet, a commercial line, or another communication line, or includes all such communication means.

Receiving apparatus 10 is a device configured to be able to obtain and store program information related to a broadcaster from which a broad cast signal can be received, and is a device for which a scheduling operation such as a recording scheduling operation and a viewing scheduling operation can be performed using the program information. Receiving apparatus 10 is a hard disk recorder, for example, but may be a DVD recorder, a BD recorder, or a television receiver, or a composite device from such devices.

Information processing apparatus 30 is a device configured to be able to instruct receiving apparatus 10 to execute a scheduling operation which has been performed by a user via a user interface based on program information displayed on a display of information processing apparatus 30. Information processing apparatus 30 is a mobile terminal, for example, but may be a personal computer, a tablet terminal, or the like.

Server 20 is a device configured to be an intermediary between receiving apparatus 10 and information processing apparatus 30, and receiving apparatus 10 and information processing apparatus 30 exchange data via server 20. Server 20 is a server computer, for example, but may be a device having a function as server 20 described in the present embodiment.

Figure 2:
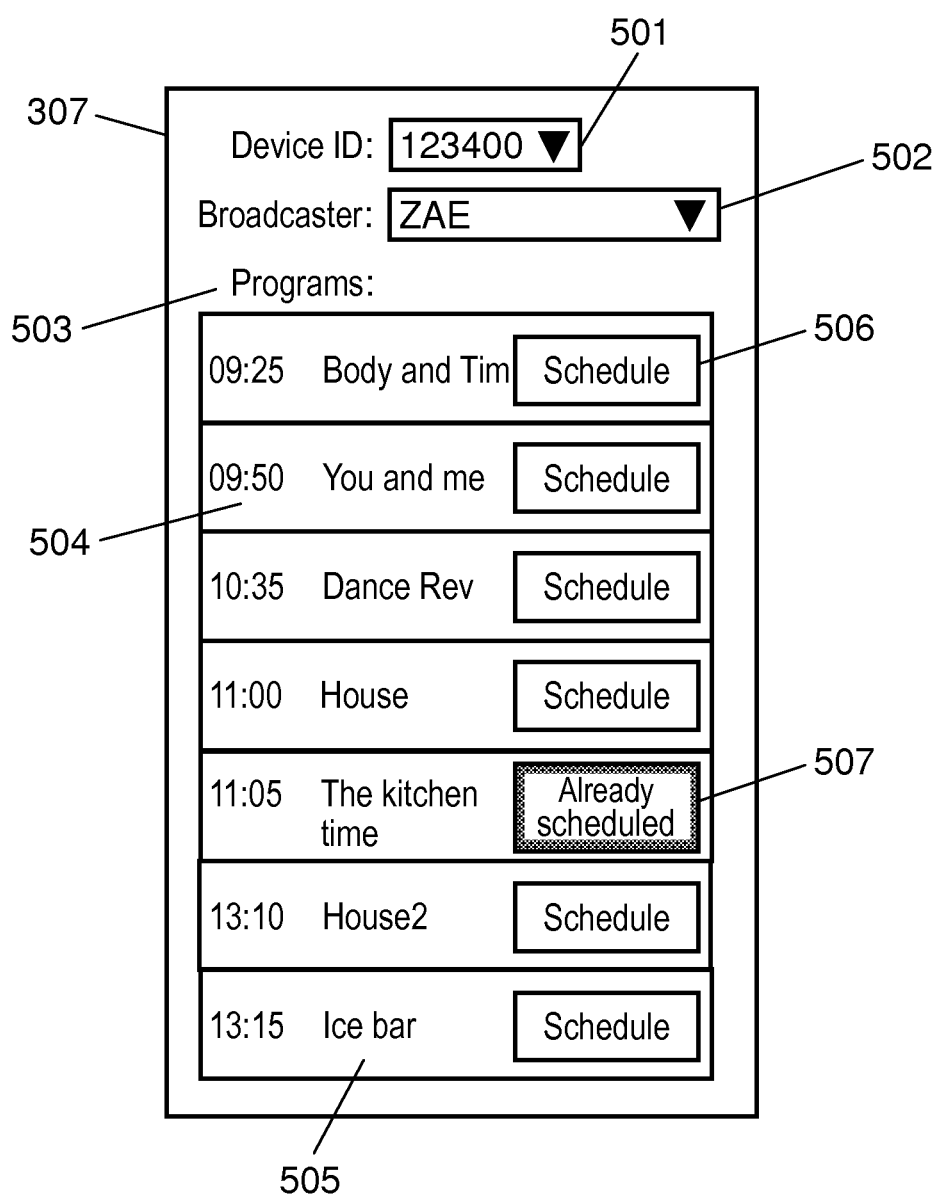
FIG. 2 illustrates an example of a user interface provided by an information processing apparatus according to the first exemplary embodiment to a user.

The following describes an example of a user interface displayed on display 307 of information processing apparatus 30, with reference to FIG. 2. FIG. 2 illustrates an example of a user interface provided to a user by information processing apparatus 30 according to the first exemplary embodiment.

As illustrated in FIG. 2, registered device list 501, broadcaster select list 502, and program list 503 are displayed on the user interface.

Registered device list 501 is a list of one or more receiving apparatuses 10 which can be selected by a user. A device ID assigned to each receiving apparatus 10 to identify that receiving apparatus 10 is displayed on registered device list 501, and the user can select a device from among one or more device IDs displayed on registered device list 50. Receiving apparatus 10 associated with the device ID selected here is a device to be operated by information processing apparatus 30. It should be noted that registered device list 501 may show, for instance, a device number or a nickname of a device associated with a device ID, instead of a device ID list. In this case, a device number and a nickname of a device, for instance, may be managed by either of server 20 and information processing apparatus 30.

When a user inputs a user ID to information processing apparatus 30, information processing apparatus 30 obtains from server 20 via communication line 40, a list of one or more receiving apparatuses 10 (device IDs) for which a scheduling operation can be performed at that time, and displays a list of one or more device IDs thereof on registered device list 501. It should be noted that information processing apparatus 30 may be configured to display, on registered device list 501, a device ID list previously set in information processing apparatus 30. Furthermore, a device ID list may be obtained via storage media such as CD-ROM or a memory card.

Broadcaster select list 502 is a list of broadcasters which can be selected by a user. The user can select one broadcaster from among one or more broadcasters displayed on broadcaster select list 502. Information on programs broadcast by the broadcaster selected here is displayed on program list 503.

Program list 503 is a list of programs which can be selected by a user. The user can select one or more programs from among one or more programs displayed on program list 503, and can perform a scheduling operation such as a recording scheduling operation or a viewing scheduling operation. In the following, information processing apparatus 30 schedules a recording on receiving apparatus 10, and "schedule" and "scheduling operation" in the following mean "recording schedule." However, "schedule" may refer to viewing schedule, or selective execution of a recording schedule and a viewing schedule, or alternatively, execution of another schedule.

Program list 503 shows programs which are broadcast by a broadcaster selected from broadcaster select list 502, and for which a scheduling operation can be performed for receiving apparatus 10 selected from registered device list 501. Such programs are identified by broadcast start time 504 and program name 505, and displayed in the order according to the broadcast start time, for example. Furthermore, program-to-be scheduled selection button 506 or mark 507 indicating "already scheduled" is displayed on the side of each program name.

Program-to-be scheduled selection button 506 is an icon for instructing receiving apparatus 10 to schedule a recording (or viewing), and a program with program-to-be scheduled selection button 506 displayed is indicated as a program which is not scheduled for recording/viewing at the time. For example, a user can schedule a recording/viewing of such a program by touching program-to-be scheduled selection button 506. Mark 507 indicating "already scheduled" is displayed for a program which is scheduled for recording/viewing (scheduled program), instead of program-to-be scheduled selection button 506. It should be noted that the design of mark 507 indicating "already scheduled" may be changed for a recording schedule and a viewing schedule.
[1-1-2. Configuration of Information Processing Apparatus]

Figure 3:
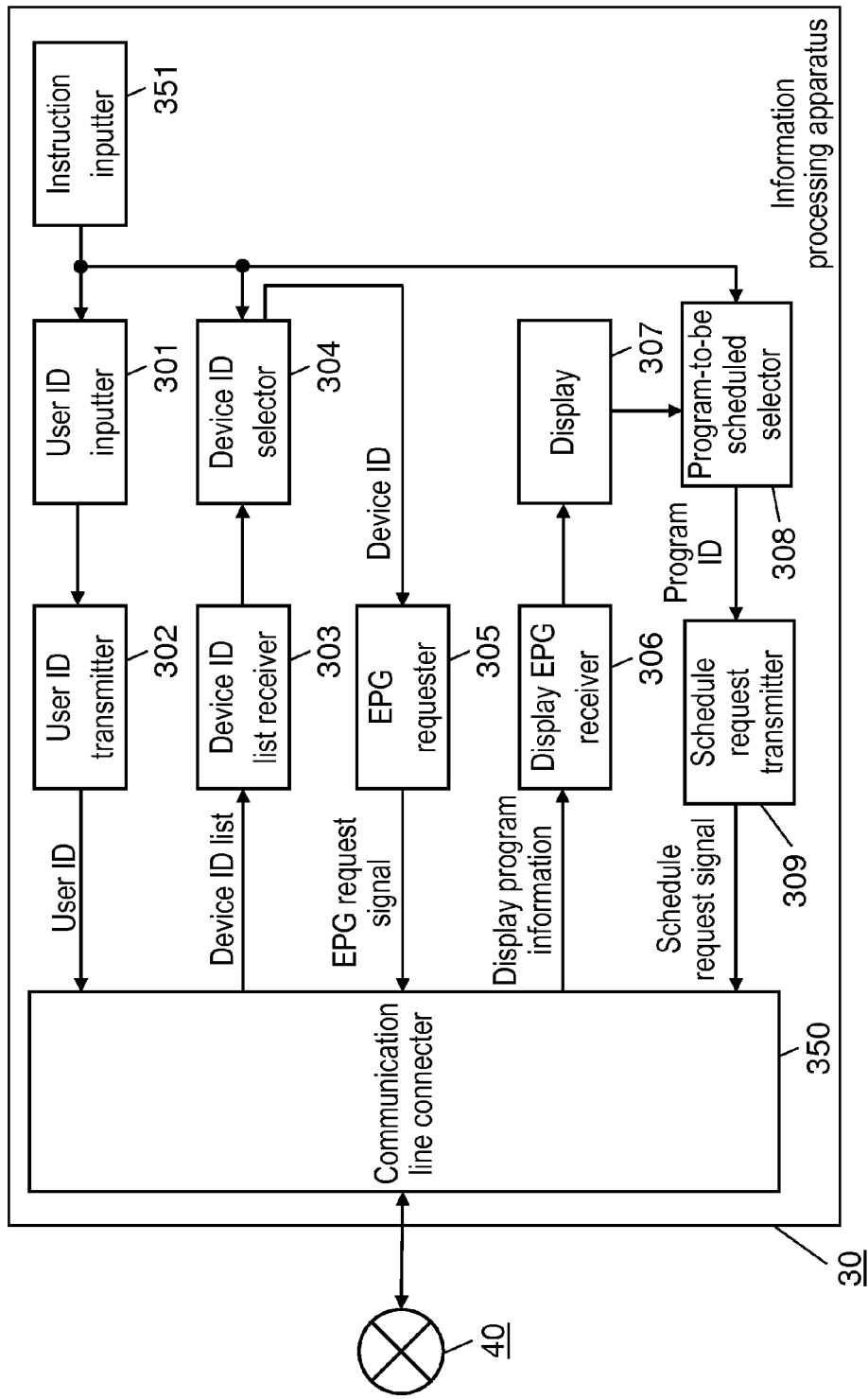
FIG. 3 is a block diagram schematically illustrating a configuration of the information processing apparatus according to the first exemplary embodiment.

FIG. 3 is a block diagram schematically illustrating a configuration of information processing apparatus 30 according to the first exemplary embodiment.

As illustrated in FIG. 3, information processing apparatus 30 includes user ID inputter 301, user ID transmitter 302, device ID list receiver 303, device ID selector 304, EPG (electronic program guide) requester 305, display EPG receiver 306, display 307, program-to-be scheduled selector 308, schedule request transmitter 309, communication line connecter 350, and instruction inputter 351.

It should be noted that FIG. 3 illustrates main blocks relevant to the operation described in the present embodiment, and functions and blocks regarding other operations are omitted. This is intended to facilitate illustration of operation performed when information processing apparatus 30 displays program information and performs a scheduling operation. Furthermore, the blocks illustrated in FIG. 3 may each include a separate circuit, or a configuration may be adopted in which a processor executes a program created so as to achieve one or more of the blocks illustrated in FIG. 3.

Instruction inputter 351 is a general term for an input device configured to accept a user instruction. Instruction inputter 351 includes, for example, various buttons such as a power button and a setting button, a touch panel, and others operated by a user. In the present embodiment, a touch panel is attached to display 307, and a user can input various instructions to information processing apparatus 30 via this touch panel. However, instruction inputter 351 is not limited to this configuration at all, and may include an audio input device, for example, or alternatively, instruction inputter 351 may have a configuration in which all input operations are performed via a touch panel or via various buttons.

Communication line connecter 350 connects information processing apparatus 30 and communication line 40 in a wired or wireless manner. Data is delivered between information processing apparatus 30 and communication line 40 via communication line connecter 350.

User ID inputter 301 accepts a user ID input by a user via instruction inputter 351, and outputs the user ID to user ID transmitter 302. This user ID is for server 20 to verify that the user is an authorized user registered in server 20. User ID inputter 301 may output a password for allowing a user ID to be accepted by server 20, to user ID transmitter 302 together with the user ID.

User ID transmitter 302 transmits a user ID (or a user ID and a password) output by user ID inputter 301 to server 20 via communication line connecter 350 and communication line 40.

It should be noted that transmission of a user ID from information processing apparatus 30 to server 20 may further double a request for transmission of a device ID list from information processing apparatus 30 to server 20.

Device ID list receiver 303 receives a device ID list transmitted through communication line 40 from server 20 via communication line connecter 350. The device ID list includes a device ID of each of zero or more receiving apparatuses 10 registered in server 20 each in association with a user ID transmitted from information processing apparatus 30 to server 20.

It should be noted that if a user ID is not associated with a device ID, a device ID may not be included in the device ID list. Furthermore, a device ID may be information which can identify receiving apparatus 10, and may not be unique identification information that is previously stored in receiving apparatus 10.

Device ID selector 304 selects one device ID from the device ID list received by device ID list receiver 303, and outputs the selected device ID to EPG requester 305. When plural device IDs are included in the device ID list, a device ID may be selected based on an instruction given by a user via a user interface such as registered device list 501 illustrated in FIG. 2. Alternatively, one determined by standard settings may be automatically selected.

EPG requester 305 transmits an EPG request signal to server 20 via communication line connecter 350 and communication line 40. This EPG request signal is a signal for requesting receiving apparatus 10 associated with a device ID selected by device ID selector 304 to transmit program information (electronic program guide, hereinafter also referred to as "EPG"), and includes information indicating the device ID.

It should be noted that if a broadcaster and a time zone to be displayed on a user interface are determined previously or by a user instruction, information indicating the broadcaster and the time zone may be transmitted being included in the EPG request signal, or transmitted independently of the EPG request signal. Information indicating a broadcaster may be a character string indicating the name of the broadcaster or may be an ID for identifying the broadcaster. A time zone may be set based on a time zone displayed on a user interface or may be set as a time zone such as morning, daytime, or night.

Display EPG receiver 306 receives via communication line connecter 350, display program information (hereinafter, also referred to as "display EPG") transmitted from server 20 through communication line 40, and outputs the display EPG to display 307. A display EPG includes at least information to be displayed on a user interface.

Display 307 displays the entire or a part of a display EPG output by display EPG receiver 306.

Program-to-be scheduled selector 308 selects at least one program included in the display EPG displayed on display 307, based on a user instruction. Then, an ID for identifying a selected program (hereafter, referred to as "program ID") is output to schedule request transmitter 309. This selected program is to be scheduled for recording/viewing, namely, a scheduled program.

A program ID is an ID (event ID) assigned by a broadcaster to each program. However, a program ID is not limited to this at all, as long as a program can be identified using a program ID. For example, a program ID may be a combination of a program broadcasting time and a name of a broadcaster or an ID for identifying a broadcaster, or an ID based on a rule determined between server 20 and information processing apparatus 30, for instance.

It should be noted that in the present embodiment, a touch made by a user on program-to-be scheduled selection button 506 of a program desired to be scheduled for recording/viewing selects the program as a scheduled program. However, a method for selecting a scheduled program is not limited to this at all. For example, a program that is broadcast at the earliest time may be selected automatically, or a program which includes a keyword previously set by a user may be selected automatically. Alternatively, a program which information processing apparatus 30 recommends may be selected automatically.

Schedule request transmitter 309 transmits a schedule request signal to server 20 via communication line connecter 350 and communication line 40. This schedule request signal includes a program ID output by program-to-be scheduled selector 308, and requests receiving apparatus 10 to schedule a recording (or viewing) of a program identified by the program ID.

[1-1-3. Configuration of Server]

Figure 4:
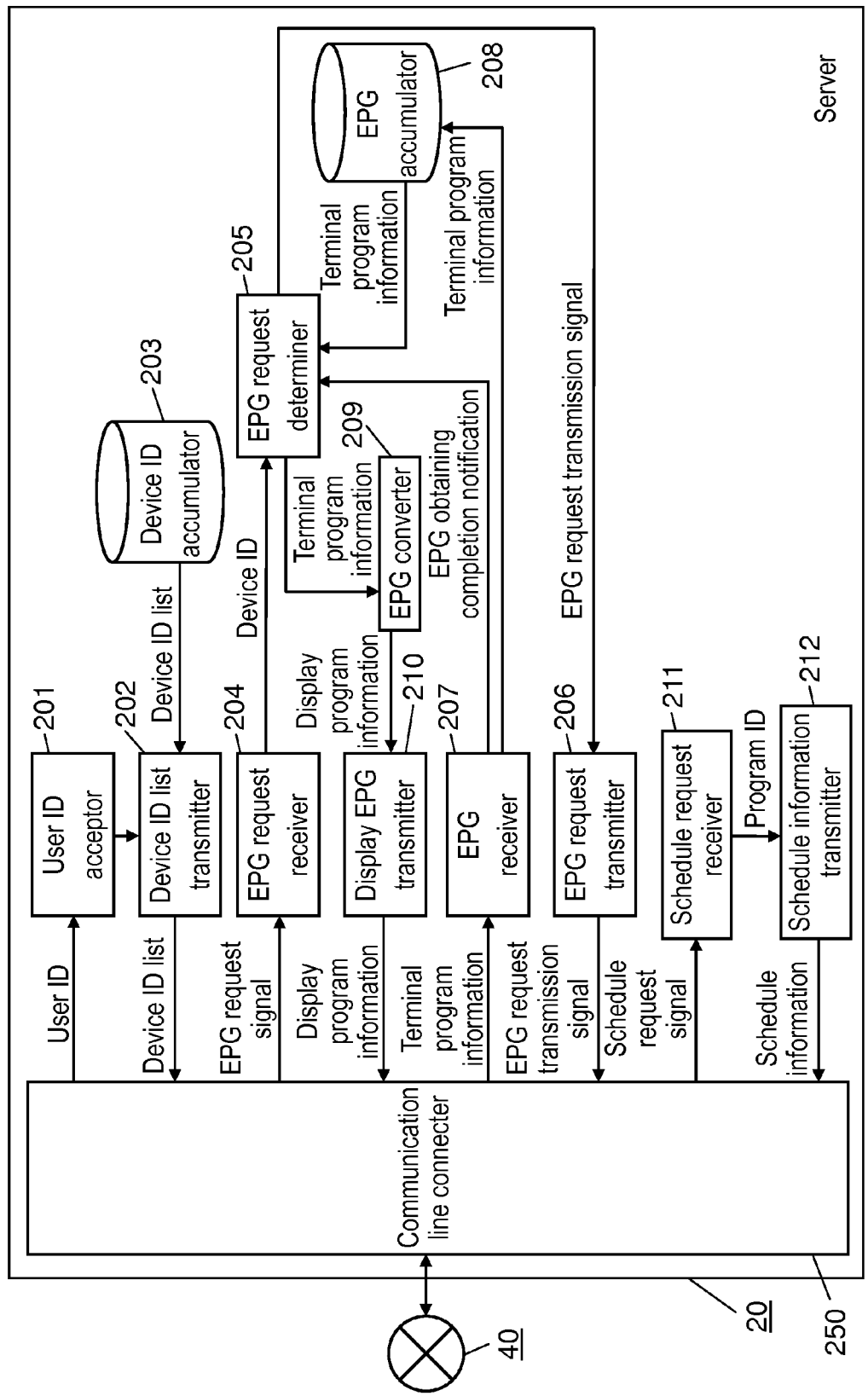
FIG. 4 is a block diagram schematically illustrating a configuration of a server according to the first exemplary embodiment.

FIG. 4 is a block diagram schematically illustrating a configuration of server 20 according to the first exemplary embodiment.

As illustrated in FIG. 4, server 20 includes user ID accepter 201, device ID list transmitter 202, device ID accumulator 203, EPG request receiver 204, EPG request determiner 205, EPG request transmitter 206, EPG receiver 207, EPG accumulator 208, EPG converter 209, display EPG transmitter 210, schedule request receiver 211, schedule information transmitter 212, and communication line connecter 250.

It should be noted that FIG. 4 illustrates main blocks relevant to the operation described in the present embodiment, and functions and blocks related to other operations are omitted. This is intended to facilitate illustration of operation performed during a delivery of an EPG and a scheduling operation via server 20. Furthermore, the blocks illustrated in FIG. 4 may each include a separate circuit, or a configuration may be adopted in which a processor executes a program created so as to achieve one or more of the blocks illustrated in FIG. 4.

Communication line connecter 250 connects server 20 and communication line 40 in a wired or wireless manner. Data is delivered between server 20 and communication line 40 via communication line connecter 250.

User ID accepter 201 receives, via communication line connecter 250, a user ID transmitted from information processing apparatus 30 through communication line 40. Then, user ID accepter 201 verifies whether the received user ID is authorized or not, and outputs the user ID to device ID list transmitter 202 if the user ID is authorized. This verification is performed by, for example, comparing a user ID previously registered in server 20 and the received user ID. Verification may be performed using a user ID and a password.

Device ID accumulator 203 stores a device ID list in association with a user ID. If a plurality of user IDs are registered in server 20, device ID accumulator 203 stored a plurality of device ID lists each associated with one of the user IDs. Device IDs may be stored in device ID accumulator 203 using a method adopted in a typical web service. For example, after a user logs in to server 20 from information processing apparatus 30 using a user ID, a device ID may be additionally registered in the device ID list associated with the user ID.

Device ID list transmitter 202 obtains, from device ID accumulator 203, a device ID list associated with a user ID output by user ID accepter 201. Then, device ID list transmitter 202 transmits the obtained device ID list to information processing apparatus 30 via communication line connecter 250 and communication line 40.

EPG accumulator 208 stores terminal program information (hereinafter, also referred to as "terminal EPG") in association with a device ID.

EPG request receiver 204 receives, via communication line connecter 250, an EPG request signal transmitted from information processing apparatus 30 through communication line 40. Then, EPG request receiver 204 extracts a device ID included in the received EPG request signal, and outputs the device ID to EPG request determiner 205. If the EPG request signal includes information designating a broadcaster and a time zone, EPG request receiver 204 also extracts such information, and outputs the information to EPG request determiner 205.

EPG request determiner 205 checks whether a terminal EPG associated with a device ID output by EPG request receiver 204 is already stored in EPG accumulator 208 or not. If information designating a broadcaster and a time zone is also output, EPG request determiner 205 checks whether such a terminal EPG is stored, taking such information into consideration as well. If the terminal EPG is stored, EPG request determiner 205 obtains, from EPG accumulator 208, a terminal EPG corresponding to such information, and outputs the terminal EPG to EPG converter 209. Otherwise, EPG request determiner 205 outputs, to EPG request transmitter 206, a signal requesting a terminal EPG corresponding to such information. Hereinafter, this signal is referred to as an "EPG request transmission signal." An EPG request transmission signal includes a device ID included in an EPG request signal, and also includes information designating a broadcaster and a time zone if such information is included in the EPG request signal.

In server 20, if a new terminal EPG based on this EPG request transmission signal is obtained and stored in EPG accumulator 208, EPG receiver 207 outputs an EPG obtaining completion notification to EPG request determiner 205. EPG request determiner 205 obtains the newly stored terminal EPG from EPG accumulator 208 in response to this EPG obtaining completion notification, and outputs the terminal EPG to EPG converter 209.

It should be noted that if only a part of a terminal EPG requested by an EPG request signal is stored in EPG accumulator 208, EPG request determiner 205 creates an EPG request transmission signal requesting the insufficiency, and outputs the signal to EPG request transmitter 206. However, this EPG request transmission signal may be created so as to re-obtain the entire terminal EPG requested by the EPG request signal.

In order to request receiving apparatus 10 associated with a device ID included in an EPG request signal to transmit an EPG, or to transmit an EPG that satisfies information designating a broadcaster and a time zone if the EPG request signal includes such information, EPG request transmitter 206 transmits an EPG request transmission signal output by EPG request determiner 205 to corresponding receiving apparatus 10 via communication line connecter 250 and communication line 40.

It should be noted that EPG request transmitter 206 may transmit all the EPG request transmission signals by one transmission operation, or may transmit the EPG request transmission signals by plural transmission operations. For example, when a request for an EPG for a plurality of broadcasters is made, EPG request transmission signals may be transmitted separately for the broadcasters. Alternatively, when a request for an EPG for two or more hours is made, the EPG may be divided by a unit time (for example, one hour), and transmission operations corresponding to the number of times obtained by the division may be made. Furthermore, an EPG request transmission signal output by EPG request determiner 205 does not include information regarding a broadcaster or a time zone, EPG request transmitter 206 may transmit an EPG request transmission signal which additionally includes information for requesting an EPG for all broadcasters and time zones. Furthermore, EPG request transmitter 206 may transmit an EPG request transmission signal which additionally includes information for requesting an EPG on that day, or an EPG request transmission signal which additionally includes information for requesting an EPG for a broadcaster and a time zone based on information previously set according to, for instance, a configuration file stored in server 20.

EPG receiver 207 receives, via communication line connecter 250, terminal program information (terminal EPG) transmitted from receiving apparatus 10 through communication line 40. Receiving apparatus 10 which has transmitted the terminal EPG is a receiving apparatus associated with a device ID included in an EPG request transmission signal transmitted by EPG request transmitter 206. Furthermore, this terminal EPG corresponds to information designating a broadcaster and a time zone which are included in this EPG request transmission signal, and includes a broadcaster, a broadcast start date and time, a broadcast end date and time, a program name, an event ID for identifying a program, and others. EPG receiver 207 stores, in EPG accumulator 208, the received terminal EPG in association with a device ID of the receiving apparatus, and outputs, to EPG request determiner 205, an EPG obtaining completion notification indicating that a terminal EPG has been obtained.

It should be noted that when EPG request transmitter 206 transmits EPG request transmission signals by plural transmissions, and receiving apparatus 10 has transmitted terminal EPGs by plural transmissions, EPG receiver 207 may output an EPG obtaining completion notification to EPG request determiner 205 after receiving all the terminal EPGs. Further, a terminal EPG does not need to include information which receiving apparatus 10 cannot obtain from a transmission signal transmitted from a broadcaster, and also information which server 20, information processing apparatus 30 and a user do not use.

EPG converter 209 converts a terminal EPG output by EPG request determiner 205 into a display format supported by information processing apparatus 30, and outputs the converted EPG to display EPG transmitter 210. This converted EPG is display program information (display EPG). Accordingly, EPG converter 209 converts a terminal EPG into a display EPG. The display formats supported by information processing apparatus 30 include, for browsers, HTML-Java (registered trademark) script, CSS (Cascading Style Sheets), and others, and for applications, SOAP (Simple Object Access Protocol), XML, JSON (JavaScript (registered trademark) Object Notation), and others.

Display EPG transmitter 210 transmits a display EPG output by EPG converter 209 to information processing apparatus 30 via communication line connecter 250 and communication line 40.

Schedule request receiver 211 receives, via communication line connecter 250, a schedule request signal transmitted from information processing apparatus 30 through communication line 40. Then, schedule request receiver 211 extracts a program ID from the received schedule request signal, and also extracts information indicating whether a schedule is a recording schedule or a viewing schedule if such information is included. Then, schedule request receiver 211 outputs the extracted program ID and such information to schedule information transmitter 212.

Schedule information transmitter 212 transmits schedule information which includes a program ID output by schedule request receiver 211, to receiving apparatus 10 via communication line connecter 250 and communication line 40. If schedule request receiver 211 outputs information indicating whether a schedule is a recording schedule or a viewing schedule, such information is also included in this schedule information.

The following describes an example of data (terminal EPG) stored in EPG accumulator 208, with reference to FIG. 5. FIG. 5 schematically illustrates an example of a terminal EPG stored in EPG accumulator 208 of server 20 according to the first exemplary embodiment.

In EPG accumulator 208, a terminal EPG is stored in a format which includes device ID, broadcaster, broadcast start date and time, broadcast end date and time, program name, event ID, and updated date, as illustrated in FIG. 5. In this way, a terminal EPG is stored in EPG accumulator 208, in association with a device ID.

Information indicating a broadcaster is a character string indicating the name of a broadcaster, but may be any information which can identify a broadcaster. Event ID is a program ID mentioned above. Furthermore, EPG accumulator 208 may not store information which server 20, information processing apparatus 30, and a user do not use.

It should be noted that server 20 may have a configuration which does not include EPG request determiner 205 and EPG accumulator 208. In that case, EPG request receiver 204 may output a received EPG request signal to EPG request transmitter 206 as it is, and EPG request transmitter 206 may output, to receiving apparatus 10, the EPG request signal as an EPG request transmission signal. Furthermore, EPG receiver 207 may output a received terminal EPG to EPG converter 209 as it is.

[1-1-4. Configuration of Receiving Apparatus]

Figure 6:
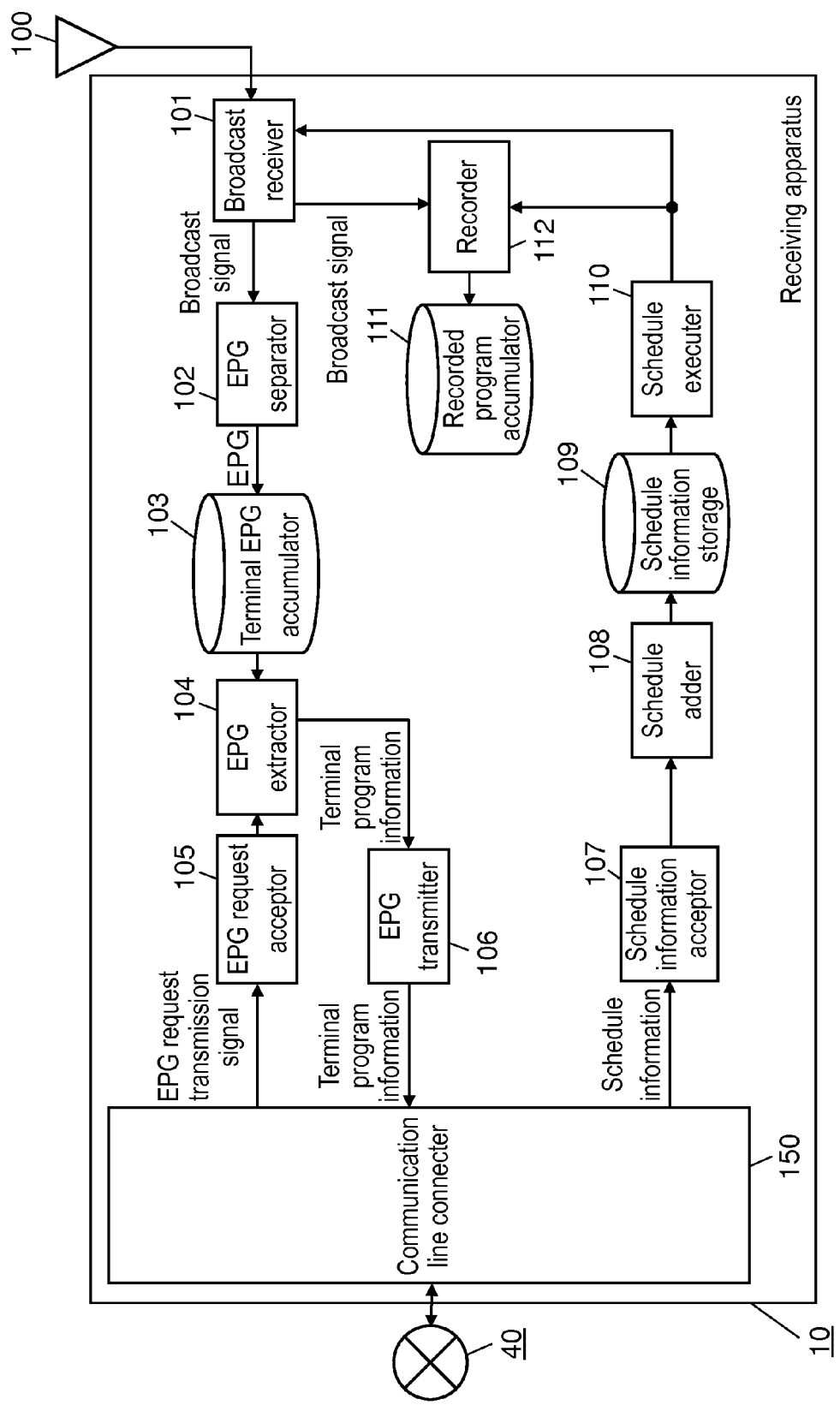
FIG. 6 is a block diagram schematically illustrating a configuration of a receiving apparatus according to the first exemplary embodiment.

FIG. 6 is a block diagram schematically illustrating a configuration of receiving apparatus 10 according to the first exemplary embodiment.

As illustrated in FIG. 6, receiving apparatus 10 includes broadcast receiver 101, EPG separator 102, terminal EPG accumulator 103, EPG extractor 104, EPG request acceptor 105, EPG transmitter 106, schedule information accepter 107, schedule adder 108, schedule information storage 109, schedule executer 110, recorded program accumulator 111, recorder 112, and communication line connecter 150.

It should be noted that FIG. 6 illustrates main blocks relevant to the operation described in the present embodiment, and functions and blocks regarding other operations are omitted. This is intended to facilitate illustration of operation performed during a delivery of an EPG and a scheduling operation via server 20. Furthermore, the blocks illustrated in FIG. 6 may each include a separate circuit, or a configuration may be adopted in which a processor executes a program created so as to achieve one or more of the blocks illustrated in FIG. 6.

Communication line connecter 150 connects receiving apparatus 10 and communication line 40 in a wired or wireless manner. Data is delivered between receiving apparatus 10 and communication line 40 via communication line connecter 150.

Broadcast receiver 101 serves as an EPG obtainer. Broadcast receiver 101 is a tuner, for example, and receives via antenna 100 a broadcast signal transmitted by a broadcaster. Then, broadcast receiver 101 outputs the received broadcast signal to EPG separator 102 and recorder 112.

EPG separator 102 separates and extracts an EPG from a broadcast signal output by broadcast receiver 101, and stores the EPG in terminal EPG accumulator 103.

Terminal EPG accumulator 103 stores an EPG output by EPG separator 102. Terminal EPG accumulator 103 may be a database for storing EPGs.

It should be noted that receiving apparatus 10 may be configured to include an EPG obtainer which obtains an EPG, separate from broadcast receiver 101, by means such as through communication line 40 or via a CD-ROM or storage media such as a memory card.

EPG request acceptor 105 receives, via communication line connecter 150, an EPG request transmission signal transmitted from server 20 through communication line 40. If the received EPG request transmission signal includes information designating a broadcaster and a time zone, EPG request acceptor 105 extracts the information from the signal and outputs the information to EPG extractor 104.

EPG extractor 104 extracts, from terminal EPG accumulator 103, an EPG corresponding to the EPG request transmission signal received by EPG request acceptor 105, and outputs the EPG to EPG transmitter 106. This extracted EPG is terminal program information (terminal EPG), and this terminal EPG corresponds to information designating a broadcaster and a time zone, which is included in an EPG request transmission signal.

It should be noted that if information designating a broadcaster and a time zone is not included in an EPG request transmission signal and is not output from EPG request acceptor 105, EPG extractor 104 preferably operates based on a setting previously registered in receiving apparatus 10. For example, if information designating a broadcaster is not included in an EPG request transmission signal, EPG extractor 104 may extract an EPG for all broadcasters from terminal EPG accumulator 103. Furthermore, an EPG for a broadcaster from which broadcast receiver 101 receives a broadcast signal at that time may be extracted from terminal EPG accumulator 103. Furthermore, if information designating a time zone is not included in the EPG request transmission signal, EPG extractor 104 may extract an EPG for all dates and time zones from terminal EPG accumulator 103. Furthermore, an EPG on that day or an EPG for 24 hours from that time may be extracted from terminal EPG accumulator 103.

EPG transmitter 106 transmits a terminal EPG output by EPG extractor 104 to server 20 via communication line connecter 150 and communication line 40. It should be noted that EPG transmitter 106 may convert and output a terminal EPG in a format determined between receiving apparatus 10 and server 20. Examples of this format include CSV (Comma Separated Values), SOAP, XML, JSON, and others.

Schedule information accepter 107 receives, via communication line connecter 150, schedule information transmitted from server 20 through communication line 40. Then, schedule information accepter 107 extracts a program ID from the received schedule information, and also extracts information indicating whether a schedule is a recording schedule or a viewing schedule if such information is included. Schedule information accepter 107 outputs the ID and such information to schedule adder 108.

Schedule information storage 109 stores a list of schedules to be executed, which are associated with program IDs. Schedule information storage 109 may be a database for storing a list of schedules to be executed.

Schedule adder 108 adds a program ID output by schedule information accepter 107 to a list of schedules stored in schedule information storage 109, which are to be executed. When schedule information accepter 107 also outputs information indicating whether a schedule is a recording schedule or a viewing schedule, schedule adder 108 adds the information in association with a program ID to the list of schedules to be executed in schedule information storage 109.

It should be noted that if information necessary for executing a schedule for (recording or viewing) a program identified by a program ID is insufficient, schedule adder 108 obtains necessary information from an EPG stored in terminal EPG accumulator 103, and causes schedule information storage 109 to store that information. For example, if a program start time is necessary, schedule adder 108 extracts, with reference to an EPG stored in terminal EPG accumulator 103, a program start time of a program from the EPG based on a program ID of the program, and causes schedule information storage 109 to store the time.

It should be noted that a list of schedules to be executed which is stored in schedule information storage 109 may include a recording schedule and a viewing schedule made in receiving apparatus 10 by direct user instruction, in addition to a schedule based on schedule information received by schedule information acceptor 107.

Schedule executer 110 instructs a block, which executes a scheduled operation, to execute that operation at a time to start the scheduled operation (recording or viewing), with reference to the list of schedules to be executed which is stored in schedule information storage 109. For example, if a list of schedules to be executed includes a recording schedule, schedule executer 110 instructs, at a time to start the recording, broadcast receiver 101 to receive a program to be recorded (program corresponding to a program ID), and instructs recorder 112 to execute recording.

Recorder 112 causes recorded program accumulator 111 to record a broadcast signal received by broadcast receiver 101. Accordingly, a program corresponding to a program ID is recorded. Recorder 112 may execute a recording operation which a user directly instructs receiving apparatus 10 to execute, in addition to a recording operation based on schedule information received by schedule information accepter 107.

It should be noted that if a viewing is scheduled on a receiving apparatus (not illustrated) which includes an image display, at a time when a program corresponding to a program ID starts, a broadcast receiver may be instructed to receive the program, and the image display may be instructed to display a received image.

Recorded program accumulator 111 records a broadcast signal received by broadcast receiver 101, based on an instruction from recorder 112. Accordingly, a recorded program is stored in recorded program accumulator 111.

It should be noted that a schedule which has been executed may be deleted from the list of schedules to be executed which is stored in schedule information storage 109, or information indicating having been executed of the schedule may be added to the list of schedules.

[1-2. Operation]

A description is given of operation of a communication system configured as described above, with reference to FIGS. 7 to 9.

[1-2-1. Display of EPG, and Scheduling Operation]

Figure 7:
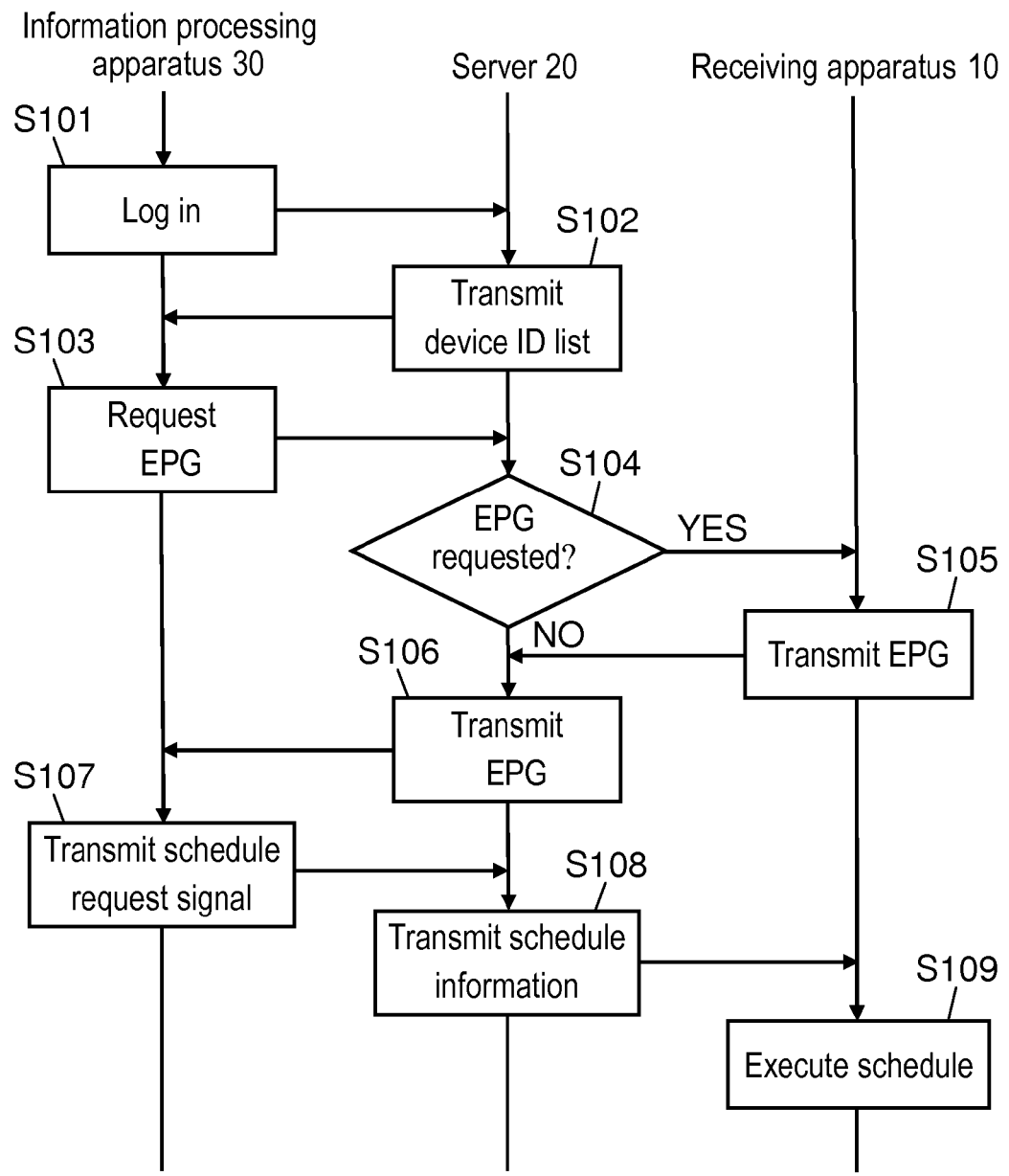
FIG. 7 is a flowchart illustrating operation of the communication system according to the first exemplary embodiment.

FIG. 7 is a flowchart illustrating operation of a communication system according to the first exemplary embodiment. The flowchart of FIG. 7 schematically illustrates operation until an EPG is displayed on information processing apparatus 30 and a recording/viewing is scheduled based on the displayed EPG, in a communication system which includes receiving apparatus 10, server 20 and information processing apparatus 30.

Information processing apparatus 30 logs in to server 20 (step S101). Information processing apparatus 30 transmits from user ID transmitter 302 to server 20 via communication line connecter 350 and communication line 40, a user ID input by a user via instruction inputter 351 and user ID inputter 301.

Server 20 transmits a device ID list based on the user ID (step S102). User ID accepter 201 receives the user ID via communication line 40 and communication line connecter 250. If the received user ID is authenticated, server 20 allows log-in with this user ID. Then, device ID list transmitter 202 obtains a device ID list associated with this user ID from device ID accumulator 203, and transmits the device ID list to information processing apparatus 30 via communication line connecter 250 and communication line 40.

Information processing apparatus 30 requests an EPG based on the device ID list (step S103). Device ID list receiver 303 receives a device ID list via communication line 40 and communication line connecter 350. This device ID list is displayed on display 307, and a device ID on the device ID list is selected based on a user instruction or selected automatically. EPG requester 305 transmits, to server 20 via communication line connecter 350 and communication line 40, an EPG request signal requesting receiving apparatus 10 associated with the selected device ID to transmit an EPG.

Server 20 determines whether to request receiving apparatus 10 to transmit an EPG (step S104). EPG request receiver 204 receives the EPG request signal via communication line 40 and communication line connecter 250. EPG request determiner 205 determines whether to request receiving apparatus 10 to transmit an EPG, based on a device ID included in the EPG request signal. If a request is to be made to receiving apparatus 10 for an EPG, an EPG request transmission signal is transmitted from EPG request transmitter 206 to receiving apparatus 10 via communication line connecter 250 and communication line 40, and operation of step S105 is executed next. If a request is not to be made to receiving apparatus 10 for an EPG, an EPG obtained from EPG accumulator 208 based on the EPG request signal is converted into a display EPG by EPG converter 209, and operation of step S106 is executed next. A detailed description of step S104 is given below.

Receiving apparatus 10 transmits an EPG to server 20 according to the EPG request transmission signal (step S105). EPG request acceptor 105 receives the EPG request transmission signal via communication line 40 and communication line connecter 150. EPG extractor 104 extracts an EPG, based on the received EPG request transmission signal, from terminal EPG accumulator 103. The extracted EPG is transmitted, as a terminal EPG, from EPG transmitter 106 to server 20 via communication line connecter 150 and communication line 40.

Server 20 converts the terminal EPG into a display EPG, and transmits the display EPG to information processing apparatus 30 (step S106). EPG receiver 207 receives the terminal EPG via communication line 40 and communication line connecter 250. EPG converter 209 converts the received terminal EPG into a display EPG. Furthermore, the received terminal EPG is stored in EPG accumulator 208 in association with a device ID. If a request is not made to receiving apparatus 10 for an EPG in step S104, an EPG obtained from EPG accumulator 208 based on the EPG request signal is similarly converted into a display EPG. The display EPG is transmitted from display EPG transmitter 210 to information processing apparatus 30 via communication line connecter 250 and communication line 40.

Information processing apparatus 30 transmits to server 20 a schedule request signal which includes a program ID (step S107). Display EPG receiver 306 receives the display EPG via communication line 40 and communication line connecter 350. This display EPG is displayed on display 307, and one or more programs on the displayed EPG are selected by program-to-be scheduled selector 308 based on a user instruction, each as a program to be scheduled for recording or viewing. Schedule request transmitter 309 transmits a schedule request signal which includes a program ID corresponding to the selected program, to server 20 via communication line connecter 350 and communication line 40.

Server 20 transmits schedule information based on the schedule request signal to receiving apparatus 10 (step S108). Schedule request receiver 211 receives the schedule request signal via communication line 40 and communication line connecter 250, and extracts a program ID. Schedule information transmitter 212 transmits schedule information which includes the program ID to receiving apparatus 10 via communication line connecter 250 and communication line 40.

Receiving apparatus 10 executes a scheduled operation, based on the schedule information (step S109). Schedule information accepter 107 receives the schedule information via communication line 40 and communication line connecter 150, and extracts a program ID. Schedule adder 108 adds the program ID to the list of schedules to be executed which is stored in schedule information storage 109. Schedule executer 110 executes a scheduled operation, based on the list of schedules to be executed which is stored in schedule information storage 109.

Figure 8:
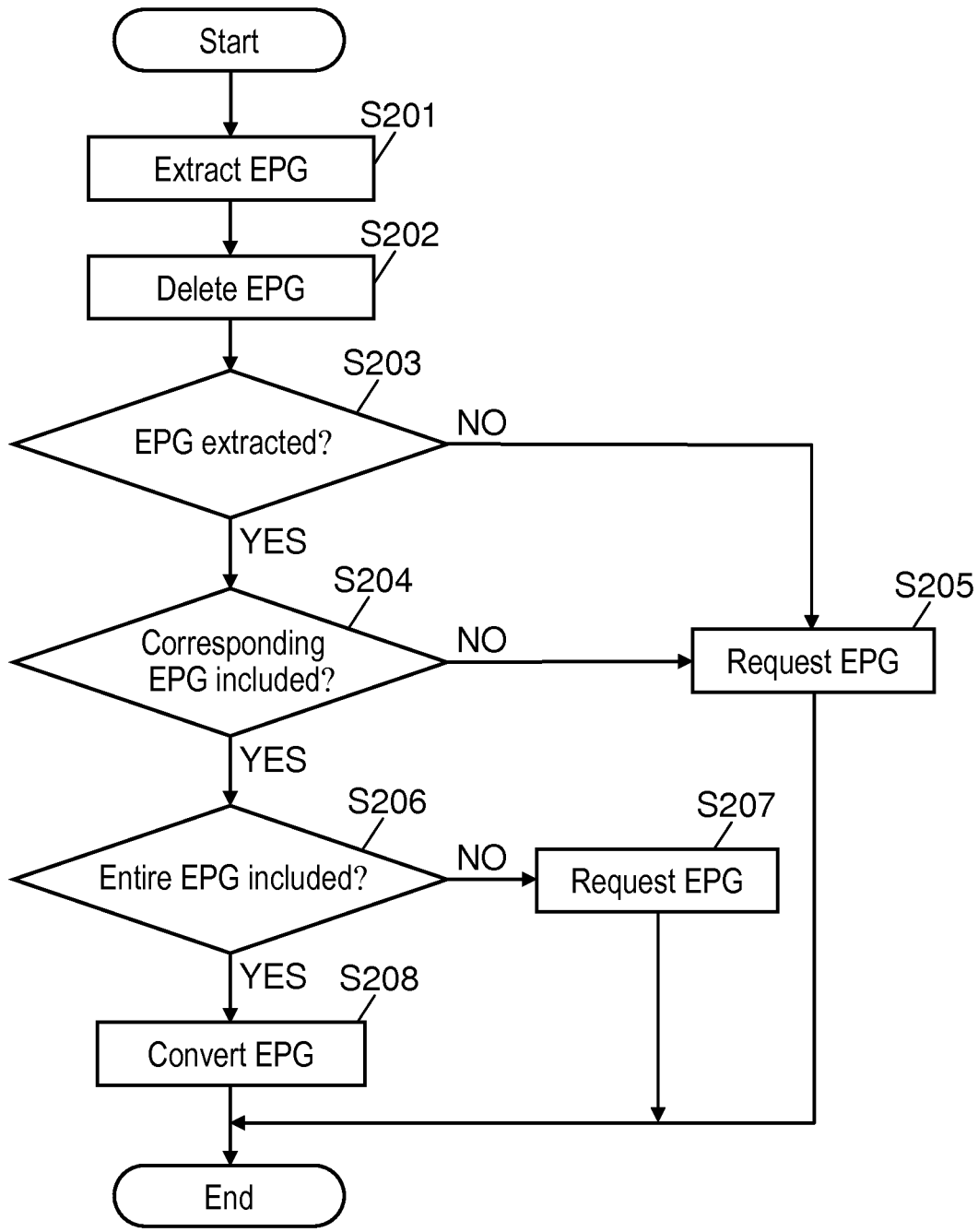
FIG. 8 is a flowchart illustrating operation by an EPG request determiner of the server according to the first exemplary embodiment.

Next is a detailed description of step S104. FIG. 8 is a flowchart illustrating operation by EPG request determiner 205 of server 20 according to the first exemplary embodiment. The flowchart illustrated in FIG. 8 shows operation of step S104 in more detail. EPG request determiner 205 performs operation illustrated in FIG. 8, and determines whether to request receiving apparatus 10 to transmit an EPG.

EPG request determiner 205 extracts, from EPG accumulator 208, a terminal EPG associated with a device ID output by EPG request receiver 204 (step S201).

EPG request determiner 205 checks updated date and time of a terminal EPG stored in EPG accumulator 208, and deletes from EPG accumulator 208 a terminal EPG which has not been updated for a predetermined time (for example, two hours) or more (step S202). A detailed description of step S202 is given below.

EPG request determiner 205 determines whether a terminal EPG associated with the device ID output by EPG request receiver 204 has been successfully extracted from EPG accumulator 208 (step S203). If a desired terminal EPG has not been successfully extracted, EPG request determiner 205 determines that the desired terminal EPG is not stored in EPG accumulator 208, and executes operation of step S205. If the desired terminal EPG has been successfully extracted, EPG request determiner 205 executes operation of step S204.

EPG request determiner 205 checks whether an EPG for a desired broadcaster is included in the extracted terminal EPG (step S204). EPG request determiner 205 checks whether an EPG for a broadcaster requested by an EPG request signal received by EPG request receiver 204 is included in the extracted terminal EPG. EPG request determiner 205 executes operation of step S205 if the EPG is not included, whereas EPG request determiner 205 executes operation of step S206 if the EPG is included.

EPG request determiner 205 outputs an EPG request transmission signal to EPG request transmitter 206 (step S205). This EPG request transmission signal is a signal requesting receiving apparatus 10 associated with a device ID included in the EPG request signal received by EPG request receiver 204 to transmit an EPG. Furthermore, this EPG request transmission signal includes information designating a broadcaster and a time zone, which is included in the EPG request signal. The EPG request transmission signal is transmitted from EPG request transmitter 206 to receiving apparatus 10 associated with the device ID via communication line connecter 250 and communication line 40.

EPG request determiner 205 checks whether an EPG for a desired time zone is included in the extracted terminal EPG (step S206). EPG request determiner 205 checks whether an EPG for the time zone requested by the EPG request signal received by EPG request receiver 204 is included in the extracted terminal EPG. EPG request determiner 205 executes operation of step S208 if all the requested time zones are included in the extracted terminal EPG, whereas EPG request determiner 205 executes operation of step S207 if some of the requested time zones are included or none of the requested time zones is included in the extracted terminal EPG.

EPG request determiner 205 outputs an EPG request transmission signal to EPG request transmitter 206 (step S207). Substantially the same operation as that of step S206 is performed in step S207, and this EPG request transmission signal is also substantially the same as the EPG request transmission signal generated in step S205. It should be noted that the result of checking operation in step S206 may be reflected in information regarding a time zone included in the EPG request transmission signal. For example, if an extracted terminal EPG is determined in step S206 to include only some of the requested time zones, information requesting an EPG for the lacking time zones may be included in the EPG request transmission signal.

EPG converter 209 converts a terminal EPG into a display EPG (step S208). EPG request determiner 205 outputs the extracted terminal EPG to EPG converter 209. EPG converter 209 converts the terminal EPG into a display EPG in a display format supported by information processing apparatus 30. Display EPG transmitter 210 transmits the display EPG to information processing apparatus 30 via communication line connecter 250 and communication line 40.

Figure 9:
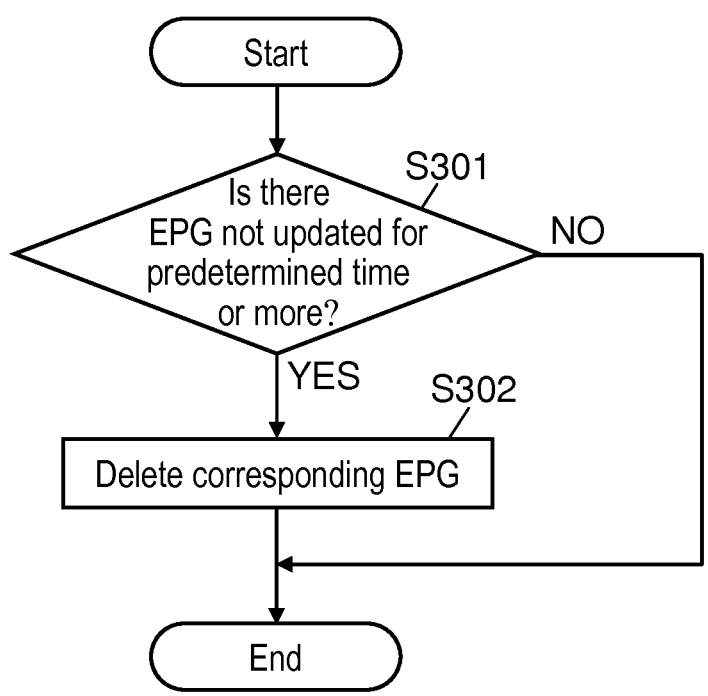
FIG. 9 is a flowchart illustrating an EPG deletion operation by the EPG request determiner of the server according to the first exemplary embodiment.

Next is a detailed description of step S202. FIG. 9 is a flowchart illustrating an EPG deletion operation by EPG request determiner 205 of server 20 according to the first exemplary embodiment. The flowchart illustrated in FIG. 9 illustrates operation of step S202 in more detail. EPG request determiner 205 performs operation illustrated in FIG. 9, determines an EPG to be deleted, and deletes the EPG from EPG accumulator 208.

For example, when a broadcasting schedule is changed, for instance, if the change is not reflected in an EPG stored in EPG accumulator 208, the actual broadcasting schedule differs from information of the EPG stored in EPG accumulator 208. Thus, a scheduled operation may be performed, at a time set before the change is made, on a program that is broadcast at the changed time. Therefore, an EPG stored in EPG accumulator 208 is preferably deleted when a predetermined time elapses.

Thus, server 20 preferably executes operation of step S301 and step S302 at predetermined times. Examples of such predetermined times include when periodical batch processing is performed, when an EPG is referred to or updated, and the like.

EPG request determiner 205 checks based on updated times of EPGs whether EPG accumulator 208 has an EPG which has not been updated for a predetermined time or more (step S301). A predetermined time is two hours, for example, but may be set to an appropriate time.

If there is an EPG which has not been updated for the predetermined time or more, EPG request determiner 205 deletes the EPG from EPG accumulator 208 (step S302).

[1-3. Advantageous Effects and Others]

As described above, in the present embodiment, information processing apparatus 30 includes EPG requester 305 and display EPG receiver 306, server 20 includes EPG request receiver 204, EPG request transmitter 206, EPG receiver 207, EPG converter 209, and display EPG transmitter 210, and receiving apparatus 10 includes broadcast receiver 101 which is an example of EPG obtainer, EPG request acceptor 105, EPG extractor 104, and EPG transmitter 106. Information processing apparatus 30 transmits, to server 20 via communication line 40, an EPG request signal requesting receiving apparatus 10 to transmit program information, and receives display program information transmitted from server 20 via communication line 40. Server 20 transmits, to receiving apparatus 10 via communication line 40, an EPG request transmission signal based on the received EPG request signal, and receives terminal program information transmitted from receiving apparatus 10 via communication line 40. After that, server 20 converts the display program information into a format supported by information processing apparatus 30, and transmits the display program information to information processing apparatus 30 via communication line 40. Receiving apparatus 10 extracts program information according to an EPG request transmission signal from the obtained program information, as terminal program information, and transmits the extracted terminal program information to server 20 via communication line 40.

In this manner, information processing apparatus 30 obtains an EPG from receiving apparatus 10 via server 20, and can instruct, via server 20, receiving apparatus 10 to perform a scheduling operation (such as a recording scheduling operation and a viewing scheduling operation) based on the obtained EPG.

For example, there is a case where a server and a receiving apparatus are installed at different places, and an EPG which includes a program broadcast at a place where receiving apparatus is installed cannot be obtained at a place where the server is installed. In such a case, according to a configuration in which the server itself obtains an EPG and provides an information processing apparatus with the EPG, the server cannot obtain an EPG for a broadcaster from which a receiving apparatus can receive a broadcast signal, and thus it is difficult for the information processing apparatus to perform a scheduling operation for the receiving apparatus.

Furthermore, when a program or a broadcasting time is changed, for instance, even if such a change is immediately reflected in an EPG superimposed on a broadcast signal transmitted by a broadcaster, such a change may not be reflected in an EPG provided by a broadcaster through a communication line, or a relatively long time may be necessary to reflect such a change after the change is made. Thus, in the configuration in which a server itself obtains an EPG and provides an information processing apparatus with the EPG, even if the server successfully obtains an EPG for a broadcaster from which a receiving apparatus can receive a broadcast signal, when a program is changed or a broadcast time is changed, for instance, such a change may not be reflected in the EPG obtained by the server. In that case, the server provides the information processing apparatus with an inaccurate EPG in which the change is not reflected, and thus the information processing apparatus may incorrectly perform a scheduling operation for the receiving apparatus.

However, according to the configuration described in the present embodiment, an EPG obtained by receiving apparatus 10 is provided to information processing apparatus 30 via server 20. Therefore, information processing apparatus 30 can perform a scheduling operation based on an EPG for a broadcaster from which receiving apparatus 10 can receive a broadcast signal. This prevents an incorrect operation, that is, an incorrect scheduling operation based on an EPG for a broadcaster from which receiving apparatus 10 cannot receive a broadcast signal. Furthermore, when a program or a broadcast time is changed, for instance, an information processing apparatus can obtain an EPG in which such a change is reflected, in a comparatively short time, which achieves a reduction in a possibility that the information processing apparatus incorrectly perform a scheduling operation for the receiving apparatus.

Second Exemplary Embodiment

The following describes a second exemplary embodiment with reference to FIGS. 10 and 11.

[2-1. Configuration]

The first exemplary embodiment has described a configuration in which a terminal EPG is managed in association with a device ID, as illustrated in FIG. 5. The second exemplary embodiment describes a configuration in which if information processing apparatus 30 is to operate a plurality of receiving apparatuses 10, terminal EPGs are managed without being associated with device IDs so that server 20 does not need to separately manage overlapping terminal EPGs for the plurality of receiving apparatus 10.

It should be noted that the second exemplary embodiment differs from the first exemplary embodiment merely in a method of managing terminal EPGs, and the configuration and operation of receiving apparatus 10, server 20, and information processing apparatus 30 is substantially the same as that in the first exemplary embodiment. The following describes main differences from the first exemplary embodiment.

FIG. 10 schematically illustrates an example of a terminal EPG stored in EPG accumulator 208 of server 20 according to the second exemplary embodiment.

As illustrated in FIG. 10, in EPG accumulator 208, a terminal EPG is stored in a format which includes broadcaster, broadcast start date and time, broadcast end date and time, program name, event ID, and updated date and time. In this way, a terminal EPG is stored in EPG accumulator 208, without being associated with device ID, unlike the first exemplary embodiment.

FIG. 11 schematically illustrates another example of a terminal EPG stored in EPG accumulator 208 of server 20 according to the second exemplary embodiment.

In the terminal EPG illustrated in FIG. 11, information indicating country is added to the terminal EPG illustrated in FIG. 10.

For example, if information processing apparatus 30 is to operate a plurality of receiving apparatuses 10 installed in different countries, terminal EPGs transmitted from the plurality of receiving apparatuses 10 to server 20 may have the same information indicating a broadcaster and the same event IDs. In that case, it is difficult for server 20 to distinguish and manage the overlapping portions.

The terminal EPG illustrated in FIG. 11 additionally includes information indicating country, and thus even if information indicating broadcaster, event ID, and others overlap, server 20 can distinguish and manage the overlapping portions.

It should be noted that if it is difficult to manage terminal EPGs transmitted from a plurality of countries in one table, due to differences in, for instance, configuration of information indicating broadcaster and event ID between the countries, a configuration may be adopted in which a table is provided for each country and terminal EPGs are managed.

[2-2. Operation]

In the configuration in which server 20 manages a terminal EPG illustrated in FIG. 10, server 20 obtains, from EPG accumulator 208, an EPG corresponding to a broadcaster included in an EPG request signal transmitted from information processing apparatus 30, and converts the EPG into a display EPG, and transmits the display EPG to information processing apparatus 30.

In the configuration in which server 20 manages a terminal EPG illustrated in FIG. 11, server 20 obtains, from EPG accumulator 208, an EPG corresponding to a country in which receiving apparatus 10 to be operated by information processing apparatus 30 is installed, and corresponding to a broadcaster included in the EPG request signal transmitted from information processing apparatus 30, converts the EPG into a display EPG, and transmits the display EPG to information processing apparatus 30.

[2-3. Advantageous Effects and Others]

As described above, in the present embodiment, server 20 manages terminal EPGs without associating the terminal EPGs with device IDs. Therefore, when information processing apparatus 30 is to operate a plurality of receiving apparatuses 10, and the plurality of receiving apparatuses 10 have overlapping EPGs for the same broadcaster, server 20 does not need to redundantly manage EPGs for the same broadcaster, and can manage a terminal EPG for each broadcaster or each country.

In this manner, the terminal EPG can be commonly used by the plurality of receiving apparatuses 10, and thus the number of times server 20 requests receiving apparatuses 10 to transmit terminal EPGs can be relatively decreased, and a time from when information processing apparatus 30 requests an EPG until when the EPG is displayed on information processing apparatus 30 can be relatively shortened.

Third Exemplary Embodiment

Figure 12:
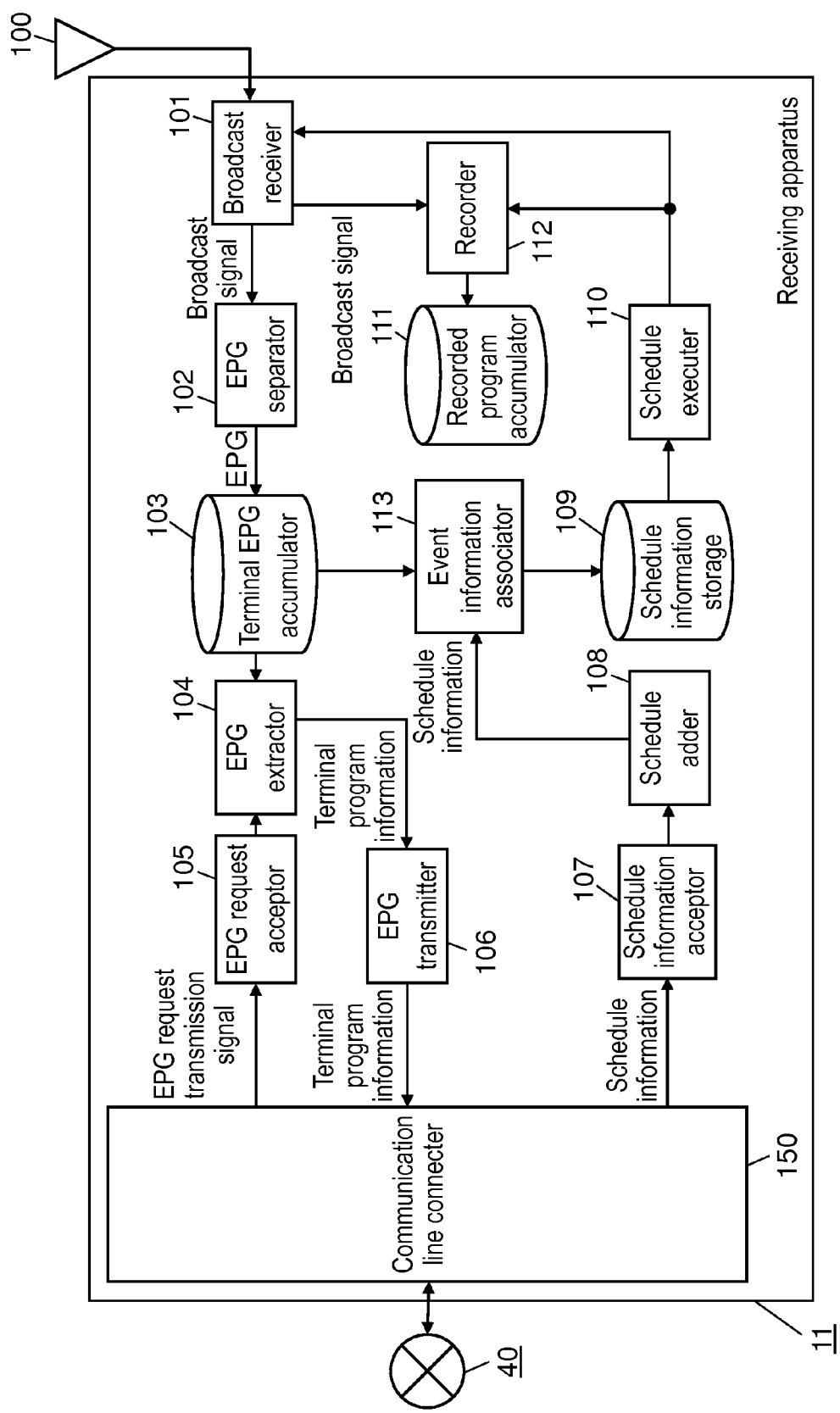
FIG. 12 is a block diagram schematically illustrating a configuration of a receiving apparatus according to a third exemplary embodiment.
Figure 13:
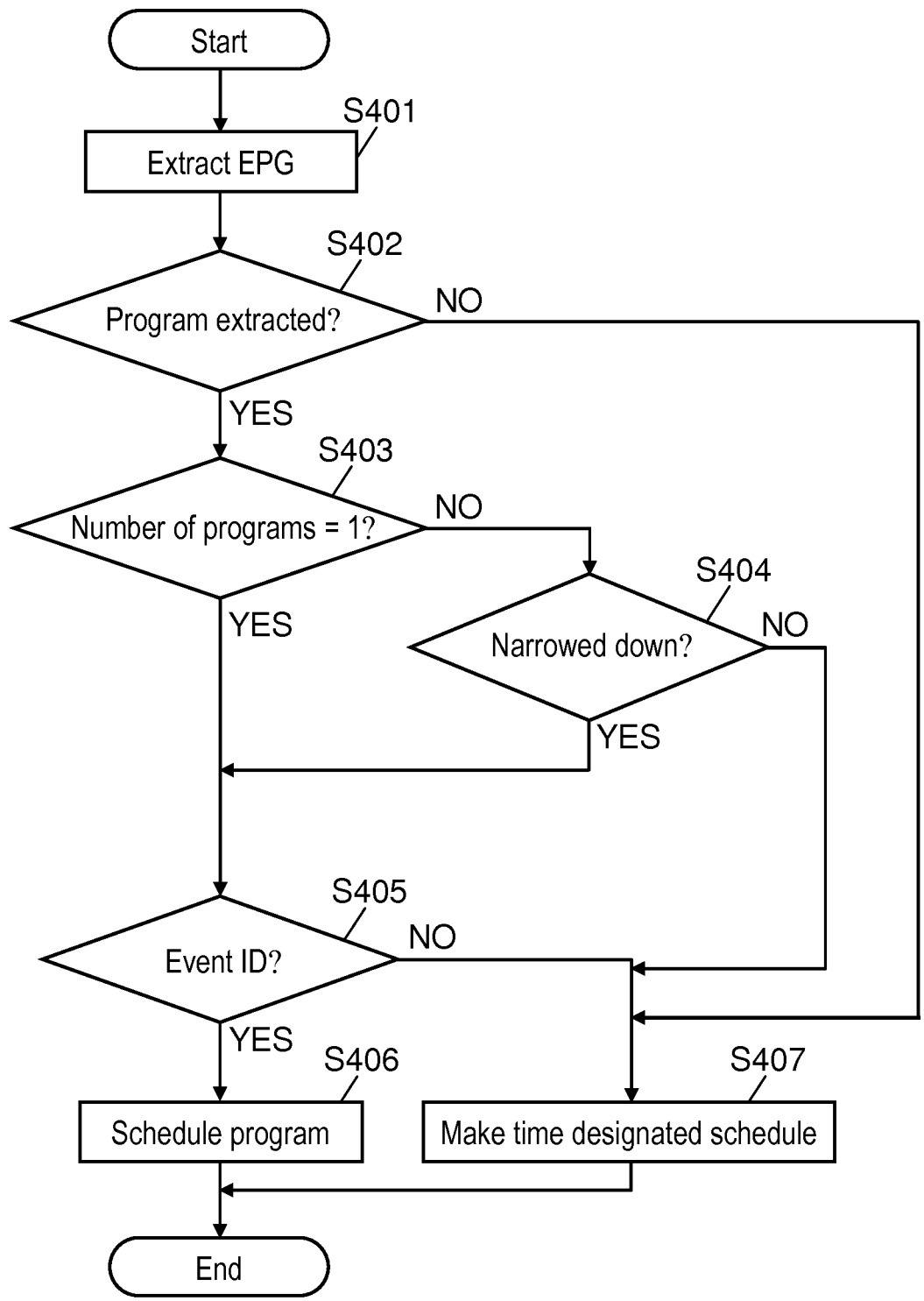
FIG. 13 is a flowchart illustrating operation by an event information associator of the receiving apparatus according to the third exemplary embodiment.

The following describes a third exemplary embodiment with reference to FIGS. 12 and 13.

[3-1. Configuration]

FIG. 12 is a block diagram schematically illustrating a configuration of receiving apparatus 11 according to the third exemplary embodiment. Receiving apparatus 11 has the configuration of receiving apparatus 10 described in the first exemplary embodiment which further includes event information associator 113.

Event information associator 113 is configured to associate schedule information received by schedule information accepter 107 with an event ID.

An event ID is an ID for identifying a program, which is assigned by a broadcaster for each program, and is not changed even in a case where for example, a broadcasting time is changed, for instance. Therefore, a program which is to be scheduled for recording or viewing is preferably managed using an event ID, rather than using a time such as a broadcast start date and time.

When schedule information received by schedule information accepter 107 includes information such as a broadcaster, a broadcast start date and time, and others, for example, event information associator 113 extracts, from an EPG stored in terminal EPG accumulator 103, an event ID based on information such as a broadcaster and a broadcast start date and time, and adds schedule information based on the extracted event ID to schedule information storage 109.

[3-2. Operation]

A description is given of operation of event information associator 113, with reference to FIG. 13. FIG. 13 is a flowchart illustrating operation by event information associator 113 of receiving apparatus 11 according to the third exemplary embodiment.

Event information associator 113 extracts a terminal EPG from terminal EPG accumulator 103, based on schedule information received by schedule information accepter 107 (step S401).

Event information associator 113 determines, based on a broadcaster, a program start time, a program end time, and others included in the schedule information, whether a specific program can be extracted from the terminal EPG extracted in step S401 (step S402). If event information associator 113 determines that a specific program can be extracted, event information associator 113 executes operation of step S403 next. Otherwise, event information associator 113 executes operation of step S407 next.

It should be noted that a program which is broadcast by the same broadcaster as that in schedule information and starts at the same time as a program start time in the schedule information may be extracted from a terminal EPG as a specific program, and all programs which are broadcast by the same broadcaster as that in schedule information, and are included between a program start time and a program end time in the schedule information may be extracted from a terminal EPG as specific programs.

Event information associator 113 determines whether the number of programs extracted in step S402 is one (step S403). If one program has been extracted, event information associator 113 executes operation of step S405 next. Otherwise, event information associator 113 executes operation of step S404 next.

When the number of programs extracted in step S402 is plural and program names are included in schedule information, event information associator 113 determines whether the plural programs can be narrowed down to one program, based on the program names (step S404). If the plural programs can be narrowed down to one program, event information associator 113 executes operation of step S405 next. Otherwise, event information associator 113 executes operation of step S407 next.

It should be noted that to narrow down plural programs based on program names in step S404, event information associator 113 may, for example, conduct a keyword search using a program name, and extract a program having a similar program name as a corresponding program.

Event information associator 113 determines whether an event ID is included in an extracted program (step S405). If an event ID is included, event information associator 113 executes operation of step S406 next. Otherwise, event information associator 113 executes operation of step S407 next.

Event information associator 113 adds schedule information based on the event ID included in the extracted program to a list of schedules to be executed which is stored in schedule information storage 109 (step S406).

When an event ID is not included in the extracted program or programs cannot be narrowed down to one program, event information associator 113 adds schedule information based on a broadcaster, a broadcast start date and time, and a broadcast end date and time, to the list of schedules to be executed which is stored in schedule information storage 109 (step S407).

[3-3. Advantageous Effects and Others]

As described above, in the present embodiment, a list of schedules to be executed which is stored in schedule information storage 109 is managed based on an event ID. In this manner, even if, for example, a broadcast time of a program scheduled for recording/viewing has been changed, the scheduled operation can be executed based on the changed time.

Other Exemplary Embodiments

The above is a description of the first to third exemplary embodiments as examples of a technique disclosed in this application. However, the technique according to the present disclosure is not limited to these, but can be also applied to embodiments in which a constituent element is changed, replaced, added, or omitted, for instance. Furthermore, the constituent elements described in the first to third exemplary embodiments can be combined to achieve another exemplary embodiment.

Now, the following is a description of other exemplary embodiments.

For example, receiving apparatus 10 described in the first exemplary embodiment may additionally have a function of transmitting, to server 20 or information processing apparatus 30, a channel list of broadcasters from which receiving apparatus 10 can receive broadcast signals.

Figure 14:
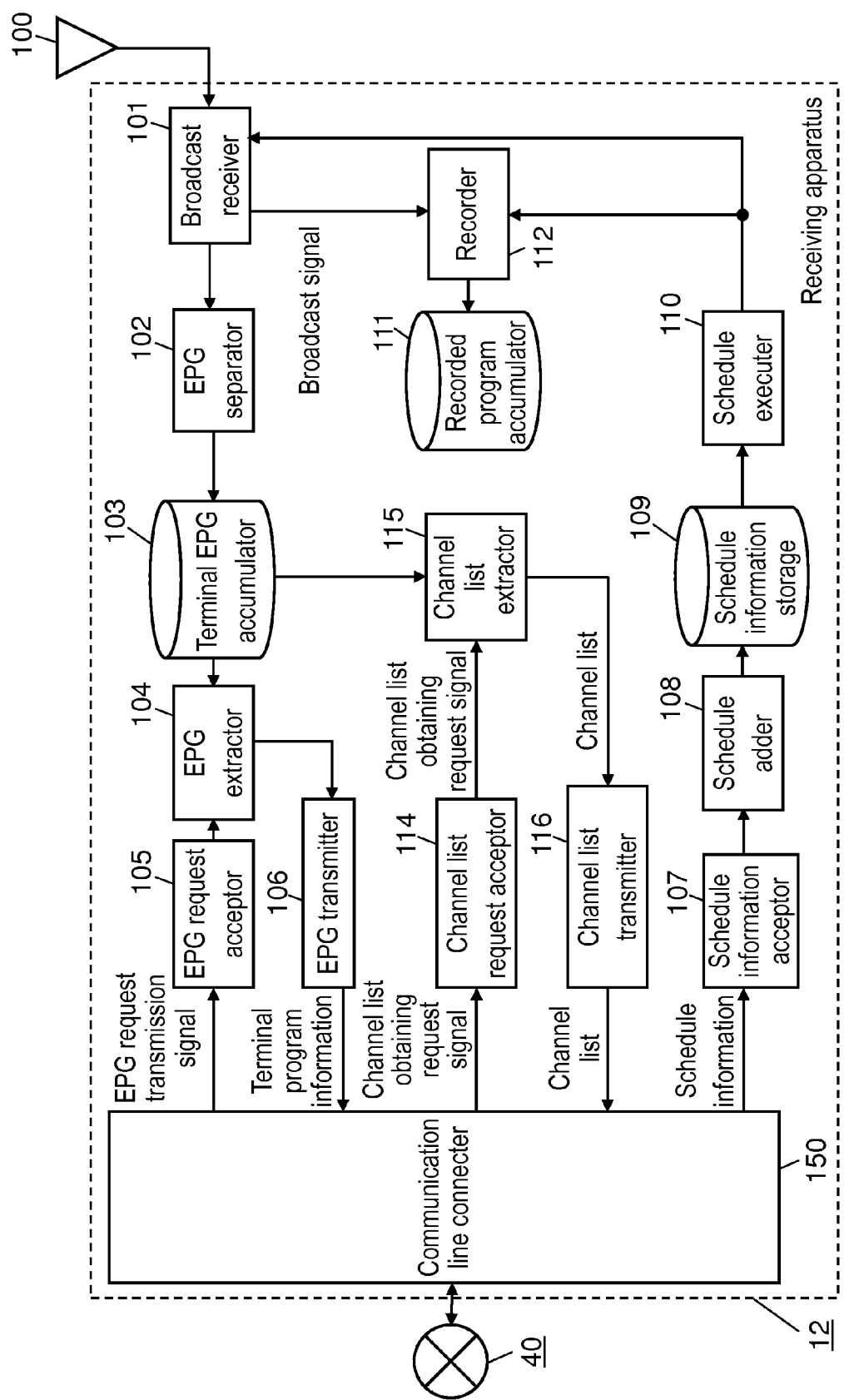
FIG. 14 is a block diagram schematically illustrating an example of a configuration of a receiving apparatus according to another exemplary embodiment.

FIG. 14 is a block diagram schematically illustrating an example of a configuration of receiving apparatus 12 according to another exemplary embodiment.

Furthermore, receiving apparatus 12 includes channel list request acceptor 114, channel list extractor 115, and channel list transmitter 116, in addition to the configuration of receiving apparatus 10 described in the first exemplary embodiment.

A channel list is a list which includes a broadcaster and an ID for identifying a broadcaster. Information processing apparatus 30 needs to obtain a channel list of broadcasters from which receiving apparatus 12 can receive broadcast signals, in order to display broadcaster select list 502. A channel list obtaining request signal for displaying broadcaster select list 502 may be transmitted from information processing apparatus 30 or server 20 to receiving apparatus 12 via communication line 40.

Channel list request acceptor 114 receives a channel list obtaining request signal via communication line 40 and communication line connecter 150, and outputs the received channel list obtaining request signal to channel list extractor 115.

Channel list extractor 115 extracts, from terminal EPG accumulator 103 in response to a channel list obtaining request signal, a list of all or some of broadcasters from which receiving apparatus 12 can receive broadcast signals, and outputs the extracted list as a channel list to channel list transmitter 116.

Channel list transmitter 116 transmits a channel list output by channel list extractor 115 to server 20 or information processing apparatus 30 via communication line connecter 150 and communication line 40.

Then, information processing apparatus 30 receives the channel list, and displays, on display 307, broadcaster select list 502 based on the channel list.

Furthermore, receiving apparatus 10 described in the first exemplary embodiment may additionally have a function of transmitting schedule information stored in receiving apparatus 10 to server 20 or information processing apparatus 30.

Figure 15:
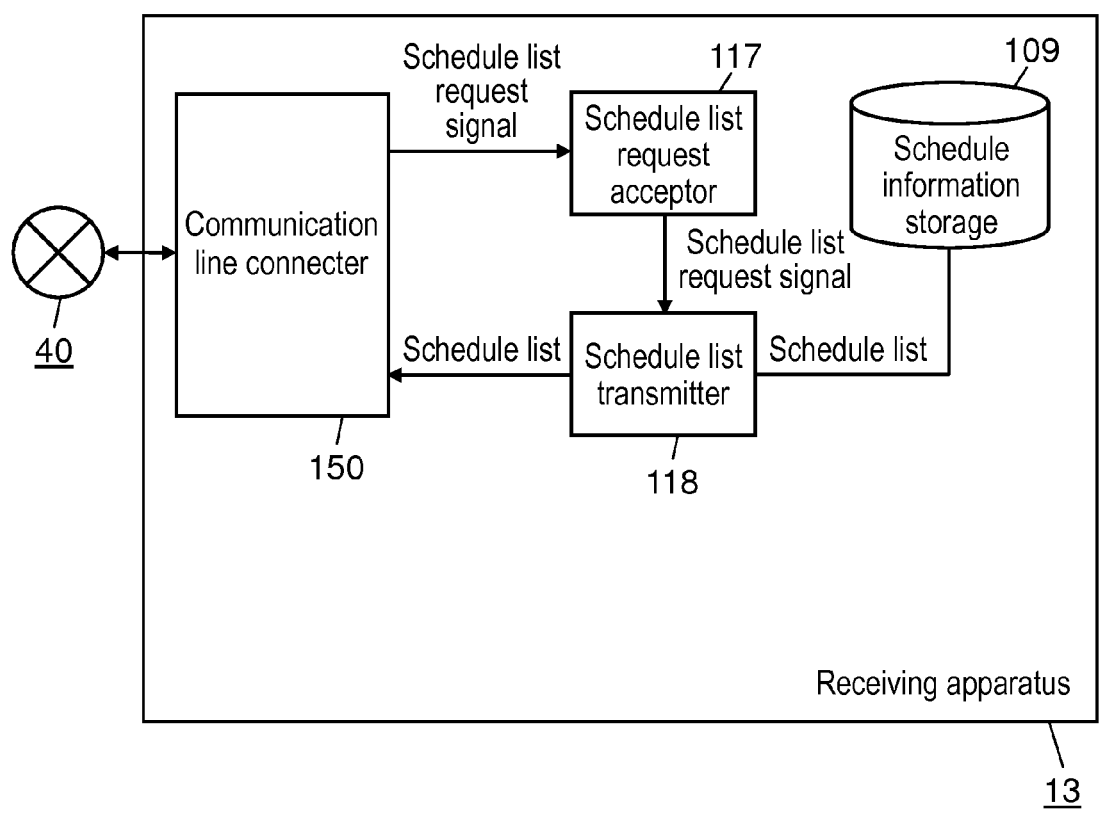
FIG. 15 is a block diagram schematically illustrating another example of a configuration of a receiving apparatus according to another exemplary embodiment.

FIG. 15 is a block diagram schematically illustrating an example of a configuration of receiving apparatus 13 according to another exemplary embodiment.

Receiving apparatus 13 further includes schedule list request acceptor 117 and schedule list transmitter 118, in addition to the configuration of receiving apparatus 10 described in the first exemplary embodiment. It should be noted that an equivalent configuration to that of receiving apparatus 10 described in the first exemplary embodiment is omitted in FIG. 15. Although schedule information storage 109 is illustrated in FIG. 15, schedule information storage 109 is substantially the same as schedule information storage 109 described in the first exemplary embodiment.

Information processing apparatus 30 may transmit, to receiving apparatus 13 via communication line 40, a schedule list request signal requesting receiving apparatus 13 to transmit a schedule list which is a list of scheduled programs, in order to be informed of a program which is already scheduled for recording/viewing on receiving apparatus 13.

Schedule list request acceptor 117 receives a schedule list request signal via communication line 40 and communication line connecter 150, and outputs the received schedule list request signal to schedule list transmitter 118.

Schedule list transmitter 118 generates a schedule list from schedule information stored in schedule information storage 109, based on the schedule list request signal, and transmits the schedule list to server 20 or information processing apparatus 30 via communication line connecter 150 and communication line 40.

Then, information processing apparatus 30 receives this schedule list, and changes, an icon illustrated aside a scheduled program to a mark 507 indicating that the program is already scheduled for recording/viewing, on a user interface displayed on display 307 illustrated in FIG. 2, for example.

Although the first to third exemplary embodiments have described configurations in which a program is scheduled for recording based on an EPG, the present disclosure may provide a configuration in which information processing apparatus 30 schedules a viewing of a program based on an EPG for a receiving apparatus which has an image display. In that case, based on schedule information stored in a schedule information storage, a schedule executer of the receiving apparatus may instruct a broadcast receiver to receive the program and the image display to display a received image, at a time when a program associated with a program ID starts. A configuration may be adopted in which, before changing a channel based on a viewing schedule, a check message for a change of a channel is displayed at this time on the image display unit, and a user is prompted to select whether to change a channel based on a viewing schedule. Furthermore, a configuration may be adopted in which this receiving apparatus includes a user authenticator, and a viewing schedule is executed only when the user authenticator authenticates a user as a user who has given an instruction to schedule the viewing or as a specific permitted user. For user authentication at this time, a means for allowing identification of a user may be used such as video authentication using a camera, voice authentication using a voiceprint or the like, and fingerprint authentication using a remote control provided with a receiving apparatus, for example. Furthermore, a configuration may be adopted in which this receiving apparatus includes a program transferor, and the program transferor transfers a program scheduled for viewing by information processing apparatus 30 to information processing apparatus 30 via communication line connecter 150 and communication line 40. According to this configuration, a user can view, on information processing apparatus 30, the program scheduled for viewing.

Furthermore, the second exemplary embodiment has described a configuration in which a plurality of receiving apparatuses share an EPG obtained by the server from one receiving apparatus. However, the configuration may be a configuration in which if information processing apparatuses are connected to one communication system and some information processing apparatuses schedule a recording/viewing of a certain program, the server uses the same schedule information for the program, and prevents the same schedule information from being repeatedly transmitted to one receiving apparatus. A configuration may be adopted in which at this time the server further includes a schedule information accumulator and a recommender, and from among programs scheduled for recording or by another user (another information processing apparatus or another receiving apparatus), a program relevant to a user of information processing apparatus 30 is recommended to an information processing apparatus which has scheduled a recording or viewing. Furthermore, recommendation information which includes information on a recommended program may be displayed on a user interface of the information processing apparatus. It should be noted that a configuration may be adopted in which, when a recommended program is displayed on the user interface, the information processing apparatus or the server determines whether a recording/viewing of the recommended program can be scheduled on a receiving apparatus operated by the information processing apparatus. This configuration allows scheduling a recording or viewing, with reference to recommendation information based on a program scheduled by another user.

It should be noted that the constituent elements described in the present embodiment may be each configured using a separate dedicated circuit, or a processor executes a program created so as to achieve operations of one or more of the constituent elements. Furthermore, a program at this time may be obtained by a download from a server or the like, and may be obtained via a predetermined recording medium (for example, an optical disc such as CD-ROM, a magnetic disk, and semiconductor memory).

It should be noted that operation of transmitting information and operation of accepting information described in the present embodiment do not include operation performed only by dedicated hardware. The operation performed only by dedicated hardware is, for example, data transmission and reception operation by modem, an interface card, and the like.

Furthermore, operations by the server described in the present embodiment may be processed centrally by a single server or distributed and processed by a plurality of servers.

INDUSTRIAL APPLICABILITY

The present disclosure is applicable to a receiving apparatus, an information processing apparatus, and a server which can transmit and receive an EPG and perform a scheduling operation via a communication line. Specifically, the present disclosure is applicable to a hard disk recorder, a DVD recorder, a BD recorder, a television receiver, a smart phone, a mobile phone, a mobile terminal, a personal computer, a tablet terminal, a server computer, and others.

REFERENCE MARKS IN THE DRAWINGS 10, 11, 12, 13 receiving apparatus
20 server
30 information processing apparatus
40 communication line
100 antenna
101 broadcast receiver
102 EPG separator
103 terminal EPG accumulator
104 EPG extractor
105 EPG request acceptor
106 EPG transmitter
107 schedule information acceptor
108 schedule adder 109 schedule information storage
110 schedule executer
111 recorded program accumulator
112 recorder
113 event information associator
114 channel list request acceptor
115 channel list extractor
116 channel list transmitter
117 schedule list request acceptor
118 schedule list transmitter
150, 250, 350 communication line connecter
201 user ID acceptor
202 device ID list transmitter
203 device ID accumulator
204 EPG request receiver
205 EPG request determiner
206 EPG request transmitter
207 EPG receiver
208 EPG accumulator
209 EPG converter
210 display EPG transmitter
211 schedule request receiver
212 schedule information transmitter
301 user ID inputter
302 user ID transmitter
303 device ID list receiver
304 device ID selector
305 EPG requester
306 display EPG receiver
307 display
308 program-to-be scheduled selector
309 schedule request transmitter
351 instruction inputter
501 registered device list
502 broadcaster select list
503 program list
504 broadcast start time
505 program name
507 mark indicating already scheduled

The invention claimed is:

1. A communication system comprising a receiving apparatus, a server, and an information processing apparatus that are configured to transmit data to and receive data from one another via a communication line,
the information processing apparatus including:
an EPG (electronic program guide) requester configured to transmit, to the server via the communication line, an EPG request signal requesting the receiving apparatus to transmit program information; and
a display EPG receiver configured to receive display program information transmitted from the server via the communication line,
the server including:
an EPG request receiver configured to receive the EPG request signal;
an EPG request transmitter configured to transmit, to the receiving apparatus via the communication line, an EPG request transmission signal based on the EPG request signal received by the EPG request receiver;
an EPG receiver configured to receive terminal program information transmitted from the receiving apparatus via the communication line;
an EPG converter configured to convert the terminal program information received by the EPG receiver into the display program information which is in a format supported by the information processing apparatus; and
a display EPG transmitter configured to transmit, to the information processing apparatus via the communication line, the display program information output from the EPG converter,
the receiving apparatus including:
an EPG obtainer configured to obtain program information;
an EPG request acceptor configured to receive the EPG request transmission signal;
an EPG extractor configured to extract, from the program information obtained by the EPG obtainer, program information according to the EPG request transmission signal as the terminal program information; and
an EPG transmitter configured to transmit the terminal program information extracted by the EPG extractor to the server via the communication line.

2. The communication system according to claim 1, wherein
the information processing apparatus further includes
a schedule request transmitter configured to transmit, to the server via the communication line, a schedule request based on the display program information received by the display EPG receiver,
the server further includes:
a schedule request receiver configured to receive the schedule request transmitted from the information processing apparatus via the communication line; and
a schedule information transmitter configured to transmit, to the receiving apparatus via the communication line, schedule information based on the schedule request received by the schedule request receiver, and
the receiving apparatus further includes:
a schedule information acceptor configured to receive the schedule information transmitted from the server via the communication line; and
a schedule executer configured to execute operation based on the schedule information received by the schedule information acceptor.

3. The communication system according to claim 1, wherein the server further includes an EPG accumulator configured to store the terminal program information received by the EPG receiver in association with information identifying the receiving apparatus.

4. The communication system according to claim 1, wherein the server further includes an EPG accumulator configured to store the terminal program information received by the EPG receiver in a format usable by a plurality of the receiving apparatuses which are connected to the communication line.

5. The communication system according to claim 2, wherein the receiving apparatus further includes a schedule execution transferor configured to transmit a result of execution by the schedule executer to the server via the communication line.

6. The communication system according to claim 2, wherein
the server further includes:
a schedule information accumulator configured to store the schedule request; and
a recommender configured to generate recommendation information according to the schedule request stored in the schedule information accumulator, and transmit the recommendation information to the information processing apparatus via the communication line, and
the information processing apparatus is configured to receive the recommendation information transmitted from the server via the communication line, and display the recommendation information on a display.

7. A server configured to transmit and receive data via a communication line, the server comprising:
- an EPG (electronic program guide) request receiver configured to receive an EPG request signal transmitted via the communication line from an information processing apparatus connected to the communication line;
- an EPG request transmitter configured to transmit, via the communication line to a receiving apparatus connected to the communication line, an EPG request transmission signal based on the EPG request signal received by the EPG request receiver;
- an EPG receiver configured to receive terminal program information transmitted from the receiving apparatus via the communication line;
- an EPG converter configured to convert the terminal program information received by the EPG receiver into display program information which is in a format supported by the information processing apparatus; and
- a display EPG transmitter configured to transmit, to the information processing apparatus via the communication line, the display program information output from the EPG converter.

8. The server according to claim 7, further comprising:
a schedule request receiver configured to receive a schedule request transmitted from the information processing apparatus via the communication line; and
a schedule information transmitter configured to transmit, to the receiving apparatus via the communication line, schedule information based on the schedule request received by the schedule request receiver.

9. The server according to claim 7, further comprising an EPG accumulator configured to store the terminal program information received by the EPG receiver in association with information identifying the receiving apparatus.

10. The server according to claim 7, further comprising an EPG accumulator configured to store the terminal program information received by the EPG receiver in a format usable by a plurality of the receiving apparatuses which are connected to the communication line.

11. The server according to claim 8, further comprising:
a schedule information accumulator configured to store the schedule request; and
a recommender configured to generate recommendation information according to the schedule request stored in the schedule information accumulator, and transmit the recommendation information to the information processing apparatus via the communication line.

12. A communication method for use in a communication system which includes a receiving apparatus, a server, and an information processing apparatus that are configured to transmit data to and receive data from one another via a communication line, the communication method comprising:
- transmitting, by the information processing apparatus, to the server via the communication line, an EPG (electronic program guide) request signal requesting the receiving apparatus to transmit program information;
- transmitting, by the server, to the receiving apparatus via the communication line, an EPG request transmission signal based on the EPG request signal which has been received;
- extracting, by the receiving apparatus, from program information included in a received broadcast signal, program information according to the EPG request transmission signal as terminal program information;
- transmitting, by the receiving apparatus, the terminal program information to the server via the communication line;
- converting, by the server, the received terminal program information into display program information in a format supported by the information processing apparatus; and
- transmitting, by the server, the display program information to the information processing apparatus via the communication line.

13. The communication method according to claim 12, further comprising:
- transmitting, by the information processing apparatus, to the server via the communication line, a schedule request based on the display program information which has been received;
- transmitting, by the server, to the receiving apparatus via the communication line, schedule information based on the schedule request which has been received; and
- executing, by the receiving apparatus, the schedule information which has been received.

* * * * *